(12) United States Patent
Imamura et al.

(10) Patent No.: US 11,378,984 B2
(45) Date of Patent: Jul. 5, 2022

(54) VESSEL-AZIMUTH CONTROL APPARATUS AND AZIMUTH CONTROLLING METHOD

(71) Applicant: Mitsubishi Electric Corporation, Tokyo (JP)

(72) Inventors: Naoki Imamura, Tokyo (JP); Ryo Sakaguchi, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 114 days.

(21) Appl. No.: 16/917,243

(22) Filed: Jun. 30, 2020

(65) Prior Publication Data
US 2021/0255640 A1    Aug. 19, 2021

(30) Foreign Application Priority Data
Feb. 18, 2020 (JP) .............................. JP2020-024896

(51) Int. Cl.
*G05D 1/08* (2006.01)
*G01C 21/20* (2006.01)
(Continued)

(52) U.S. Cl.
CPC ........... *G05D 1/0875* (2013.01); *B63H 25/04* (2013.01); *G01C 21/203* (2013.01); *G05D 1/0206* (2013.01)

(58) Field of Classification Search
CPC ........ G01C 21/00; G01C 21/02; G01C 21/04; G01C 21/08; G01C 21/06203; G01C 21/10; G01C 21/12; G01C 21/20; G01C 21/203; B63H 25/02; B63H 25/022; B63H 25/026; B63H 25/045; B63H 25/06; B63H 25/04; B63H 25/066; B63H 25/42; G05D 1/00; G05D 1/02; G05D 1/0206; G05D 1/0223; G05D 1/0875; B62D 6/00; B62D 6/02; B62D 1/00; B62D 1/24; B62D 1/26
(Continued)

(56) References Cited

U.S. PATENT DOCUMENTS 9,676,464 B2 *   6/2017  Johnson ............... G05D 1/0206
11,169,524 B2 * 11/2021  Imamura ................ B63H 20/12
(Continued)

FOREIGN PATENT DOCUMENTS

JP      08-207894 A    8/1996
JP    2006-213261 A    8/2006
(Continued)

OTHER PUBLICATIONS

Communication dated Apr. 27, 2021 buy the Japanese Patent Office in application No. 2020-024896.

*Primary Examiner* — Anthony R Jimenez
(74) *Attorney, Agent, or Firm* — Sughrue Mion, PLLC; Richard C. Turner

(57) ABSTRACT

A vessel-azimuth control apparatus is configured in such a way that an azimuth controller generates and outputs an angular velocity command, based on an azimuth command from an azimuth command generator and an actual azimuth, in such a way that an angular velocity controller generates and outputs a steering angle command, based on the angular velocity command, a vessel speed, and an actual angular velocity, and in such a way that a vibration suppression controller outputs a final steering angle command, based on the steering angle command.

20 Claims, 14 Drawing Sheets

(51) Int. Cl.
*B63H 25/04* (2006.01)
*G05D 1/02* (2020.01)

(58) Field of Classification Search
USPC .......................................................... 701/21
See application file for complete search history.

(56) References Cited

U.S. PATENT DOCUMENTS

2018/0080954 A1  3/2018  Ono et al.
2019/0324462 A1  10/2019  Imamura et al.

FOREIGN PATENT DOCUMENTS

| JP | 2014-136509 A | 7/2014 |
| JP | 2016-188793 A | 11/2016 |
| JP | 2019-188830 A | 10/2019 |

* cited by examiner

VESSEL-AZIMUTH CONTROL APPARATUS AND AZIMUTH CONTROLLING METHOD

BACKGROUND OF THE INVENTION

Field of the Invention

The present disclosure relates to a vessel-azimuth control apparatus and an azimuth controlling method.

Description of the Related Art

A vessel-azimuth control apparatus is an apparatus that is utilized, as a vessel control apparatus for controlling sailing of a vessel equipped with an outboard motor or an inboard motor, and that is to make the vessel sail while holding a desired azimuth or to make the vessel sail while changing the azimuth to a desired one. A conventional vessel control apparatus disclosed in Patent Document 1 has a track calculation unit for calculating an optimum reference course based on a track plan, a feedback controller for stabilizing a control loop, and a feedforward controller for raising the course-changing performance of the control loop; the vessel control apparatus is configured in such a way as to receive the respective values of the angular acceleration and the angular velocity of a vessel at a time when the sailing directions of the vessel are changed and in such a way as to realize an optimum course-changing track plan, while taking the performance of the steering motor and the characteristics of the vessel into consideration.

A conventional vessel steering system disclosed in Patent Document 2 has a disturbance power calculation unit that detects, from a disturbance characteristic, a local-maximum frequency at which the value of disturbance power becomes locally maximum and a control filter that removes a frequency component corresponding to the local-maximum frequency from a course deviation or attenuates the frequency component; the vessel steering system is configured in such a way as to identify a sailing body movement model among control-type multidimensional (six dimensional, at most) auto-regressive models by use of an azimuth deviation and a steering angle command, based on a preliminarily obtained movement performance of the sailing body and a disturbance characteristic obtained through the sailing of the sailing body and in such a way as to output a steering angle command value corresponding to a course deviation of the sailing body by use of an optimum control gain obtained from the sailing body movement model so that unnecessary steering caused by a disturbance is reduced.

PRIOR ART REFERENCE

Patent Document

[Patent Document 1] Japanese Patent Application Laid-Open No. H8-207894
[Patent Document 2] Japanese Patent Application Laid-Open No. 2014-136509

SUMMARY OF THE INVENTION

In general, a vessel has its inherent characteristic that the frequency response characteristic of the actual yaw rate to an actual steering angle changes in accordance with the vessel speed. In the case of the conventional vessel automatic steering apparatus disclosed in Patent Document 1, both of the respective gains of the feedback controller and the feedforward controller are fixed values; therefore, for example, in the case of a low vessel speed of 10 [km/h] or so, even when steering is performed in order to change azimuths in which the vessel sails, it is difficult to change the azimuths; in the case of a high vessel speed of 90 [km/h] or so, when steering is performed in order to change azimuths in which the vessel sails, the azimuths can readily be changed. In other words, in a vessel, which is a subject of control, the frequency response characteristic of the actual yaw rate to an actual steering angle has a vessel-speed dependency; therefore, in the case of the conventional vessel automatic steering apparatus disclosed in Patent Document 1, there has been a problem that because the gains of the controllers are fixed values, the azimuth control responsiveness varies depending on the vessel speed and in the worst case, the azimuth control system becomes unstable. Moreover, in some cases, a vibration caused by the dynamic characteristic of a vessel itself, as a control subject, and a disturbance such as wind or a wave appears in an azimuth detection value; therefore, because in the case where the frequency component of the vibration caused by the disturbance exists out of the control band of the azimuth control system, control for suppressing the frequency component of the vibration caused by the disturbance cannot be performed, there has been a problem that the actual azimuth vibrates and hence the sailing comfort is deteriorated.

In contrast, in the case of the conventional automatic steering apparatus disclosed in Patent Document 2, because although extraction of the disturbance component within the azimuth control band is mainly performed, suppression of the disturbance component within the azimuth control band can originally be controlled, it is rather required, in practice, to suppress the disturbance component outside the azimuth control band; however, no measures for the disturbance component outside the azimuth control band are taken; thus, when the disturbance component outside the azimuth control band is fed back, the actual azimuth is vibrated by that disturbance component and hence the azimuth control system may become unstable. In addition, because in sequential estimation based on the multidimensional auto-regressive model, the calculation load generally increases as the order rises, the sequential estimation based on the multidimensional auto-regressive model cannot be completed within a predetermined control period in the calculation process of the sequential estimation; thus, there has been a problem that when an erroneous estimation value is reflected in the controller, the azimuth control system becomes unstable.

The present disclosure is to disclose a technology for solving the foregoing problems; the objective thereof is to provide a vessel-azimuth control apparatus and an azimuth controlling method that enable stable sailing of a vessel.

A vessel-azimuth control apparatus disclosed in the present disclosure is a vessel-azimuth control apparatus that has a steering angle control system for controlling a steering angle of a vessel, based on a command for controlling a steering angle, that is provided in a vessel control apparatus that steers the vessel, based on control of the steering, and that has a function of making the vessel sail while holding a desired azimuth or making the vessel sail while changing an azimuth to a desired one; the vessel-azimuth control apparatus includes an azimuth command generator that converts an azimuth signal generated through operation of a user interface into an azimuth command and then outputs the azimuth command, an azimuth controller that generates and outputs an angular velocity command, based on the azimuth command, an angular velocity controller that generates and outputs a steering angle command, based on the angular velocity command, and a vibration suppression controller that suppresses a vibration component superimposed on the steering angle command and existing outside an angular velocity control band and that generates and outputs a final steering angle command; the vessel-azimuth control apparatus is characterized in that the final steering angle command is provided, as a command for controlling the steering angle, to the steering angle control system.

A vessel-azimuth control apparatus disclosed in the present disclosure is a vessel-azimuth control apparatus that has a steering angle control system for controlling a steering angle of a vessel, based on a command for controlling a steering angle, that is provided in a vessel control apparatus that steers the vessel, based on control of the steering, and that has a function of making the vessel sail while holding a desired azimuth or making the vessel sail while changing an azimuth to a desired one; the vessel-azimuth control apparatus includes a vibration suppression controller that suppresses and outputs a vibration component existing outside a control band and superimposed on sensor group information from a sensor group provided in the vessel, and an azimuth command generator that converts an azimuth signal generated through operation of a user interface into an azimuth command and then outputs the azimuth command, an azimuth controller that generates and outputs an angular velocity command, based on the azimuth command and a processed actual azimuth outputted from the vibration suppression controller, and an angular velocity controller that generates and outputs a final steering angle command, based on the angular velocity command and a processed actual angular velocity outputted from the vibration suppression controller; the vessel-azimuth control apparatus is characterized in that the final steering angle command is provided, as a command for controlling the steering angle, to the steering angle control system.

A vessel-azimuth controlling method disclosed in the present disclosure is a vessel-azimuth controlling method for making a vessel sail while holding a desired azimuth or while changing an azimuth to a desired one; the vessel-azimuth controlling method is characterized by including the steps of:

converting an azimuth signal obtained through operation of an user interface into an azimuth command;

generating an angular velocity command for making a deviation between the azimuth command and an actual azimuth zero;

generating a steering angle command for making a deviation between the angular velocity command and an actual angular velocity zero;

generating a final steering angle command by attenuating a vibration component superimposed on the steering angle command; and controlling an azimuth of the vessel, based on the final steering angle command.

A vessel-azimuth controlling method disclosed in the present disclosure is a vessel-azimuth controlling method for making a vessel sail while holding a desired azimuth or while changing an azimuth to a desired one; the vessel-azimuth controlling method is characterized by including the steps of:

suppressing a vibration component existing outside a control band and superimposed on sensor group information from a sensor group provided in the vessel so as to generate a processed actual azimuth and a processed actual angular velocity;

converting an azimuth signal obtained through operation of an user interface into an azimuth command;

generating an angular velocity command for making a deviation between the azimuth command and the processed actual azimuth zero;

generating a final steering angle command for making a deviation between the angular velocity command and the processed actual angular velocity zero; and controlling an azimuth of the vessel, based on the final steering angle command.

A vessel-azimuth control apparatus disclosed in the present disclosure makes it possible to obtain a vessel-azimuth control apparatus that enables stable sailing of a vessel.

A vessel-azimuth controlling method disclosed in the present disclosure makes it possible to obtain a vessel-azimuth controlling method that enables stable sailing of a vessel.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Figure 1:
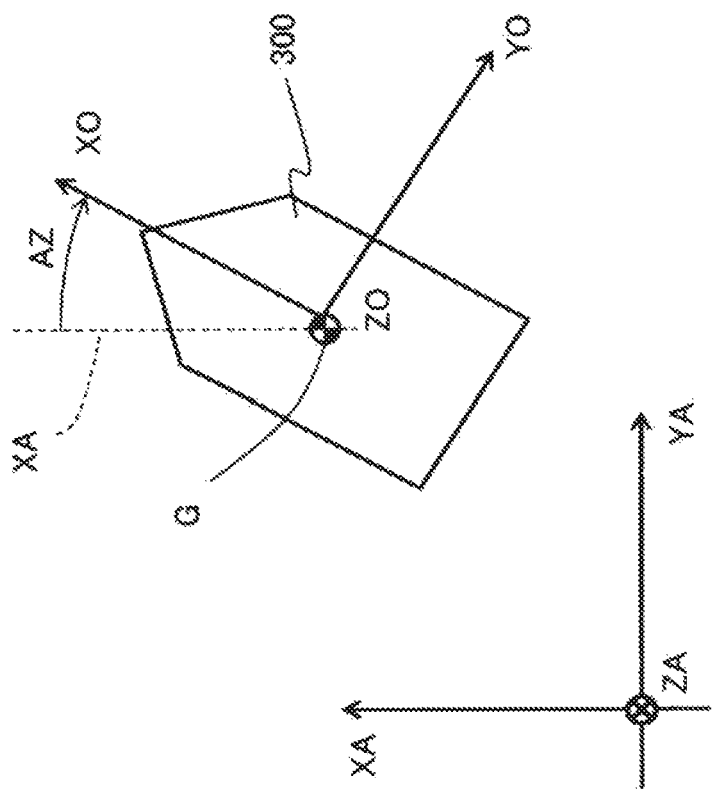
FIG. 1 is an explanatory chart that represents the respective definitions for an inertial coordinate system and a hull fixed coordinate system for explaining the azimuth of a vessel, in a vessel-azimuth control apparatus and an azimuth controlling method according to Embodiment 1.

Hereinafter, the vessel-azimuth control apparatuses and the azimuth controlling methods according to respective Embodiments of the present disclosure will be explained by use of the drawings. In each of Embodiments, the same or equivalent constituent elements are designated by the same reference characters.

Embodiment 1

FIG. 1 is an explanatory chart that represents the respective definitions for an inertial coordinate system and a hull fixed coordinate system for expressing the azimuth of a vessel, in a vessel-azimuth control apparatus and an azimuth controlling method according to Embodiment 1. In FIG. 1, the inertial coordinate system is a coordinate system fixed in an inertial space in which the law of inertia is established; the inertial coordinate system has an axis XA parallel to the plane of the paper, an axis YA parallel to the plane of the paper and perpendicular to the axis XA, and an axis ZA perpendicular to the plane of the paper and the axes XA and YA. The hull coordinate system is a coordinate system that is fixed to a gravity center position G of a vessel 300, as a hull, and travels or rotates in the inertial space; the hull coordinate system has an axis XO parallel to the plane of the paper, an axis YO parallel to the plane of the paper and perpendicular to the axis XO, and an axis ZO perpendicular to the plane of the paper and the axes XO and YO.

An azimuth AZ is expressed by a relative angle between the axis XA in the inertial coordinate system, which is a reference coordinate system, and the axis XO in the hull fixed coordinate system. In addition, an "azimuth angle" is obtained by expressing an "azimuth" with an angle and is referred to also as a "yaw angle"; however, in the present disclosure, it is assumed that as long as it is not particularly defined, an "azimuth" is synonymous with each of an "azimuth angle" and a "yaw angle"; moreover, it is assumed that as long as it is not particularly defined, an after-mentioned "angular velocity" is synonymous with a so-called "yaw rate", expressed as a time differential of an azimuth.

Figure 2:
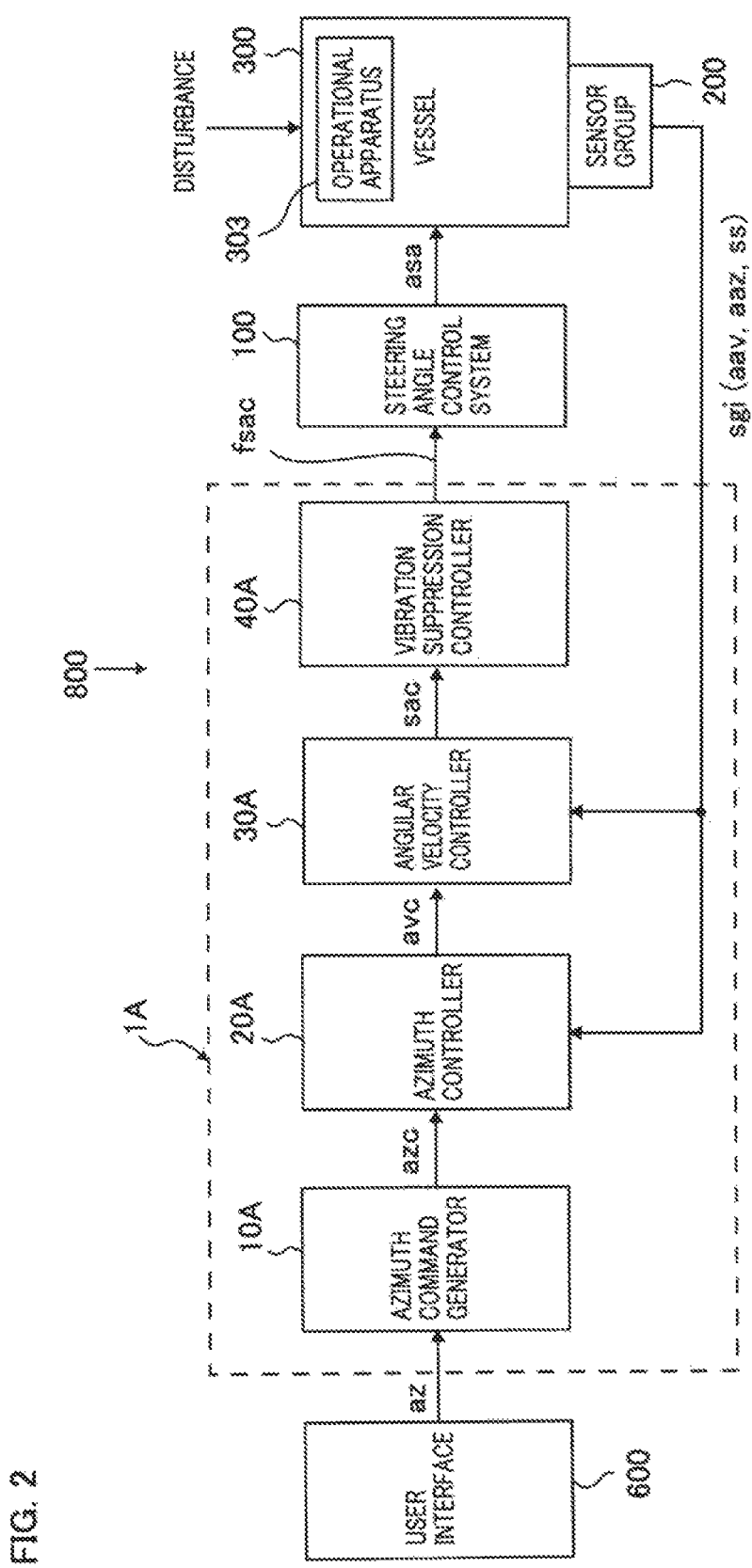
FIG. 2 is a functional block diagram representing the overall configuration of a vessel control apparatus provided with the vessel-azimuth control apparatus according to Embodiment 1.

FIG. 2 is a functional block diagram representing the overall configuration of a vessel control apparatus provided with a vessel-azimuth control apparatus according to Embodiment 1. In FIG. 2, a vessel control apparatus 800 includes an operational apparatus 303, a user interface 600, an azimuth control apparatus 1A according to Embodiment 1, a steering angle control system 100, and a sensor group 200.

The vessel 300 is provided with the vessel control apparatus 800 and an outboard motor (unillustrated), which is an actuator for controlling longitudinal-and-transverse translational motion of the vessel or the azimuth thereof. The operational apparatus 303 is provided with a user interface 600 such as a joystick. The user interface 600 provided in the operational apparatus 303 generates an azimuth signal az for holding the azimuth of the bow in a direction intended by a vessel operator or for changing the azimuth to that direction. As the user interface 600, any kind of GUI (Graphical User Interface), such as a touch panel for instructing vessel steering with a fingertip of a vessel operator or a voice recognition apparatus for instructing vessel steering with a voice of a vessel operator, can be utilized.

The outboard motor is provided with a thrust generation mechanism (unillustrated) for providing thrust to the vessel 300 and a steering mechanism (unillustrated) for steering the vessel 300; based on a final steering angle command fsac, which is an output of the azimuth control apparatus 1A of the vessel 300, control is performed in such a way that an actual steering angle asa of the outboard motor keeps track of the final steering angle command fsac. The outboard motor is a propulsion/steering mechanism for the vessel 300; an outboard-motor main body in which a screw is integrally provided beneath the engine of the outboard motor is mounted at the outside of the vessel body of the vessel 300; the azimuth AZ of the vessel 300 can be changed by changing the direction of the outboard-motor main body. Such outboard motors are utilized in many small-sized boats.

The control subject of the vessel-azimuth control apparatus 1A according to Embodiment 1 is not limited to a vessel provided with an outboard motor but includes also a vessel provided with an inboard motor. The inboard motor, here, is a propulsion/steering mechanism in which a driving unit such as an engine is provided inside a vessel and that has a mode in which a screw unit exposed outside the vessel generates thrust and the direction of the thrust is changed with a rudder. Such inboard motors are utilized in many large-sized boats.

The sensor group 200 for detecting the movement state of the vessel 300 includes, for example, a GPS (Global Positioning System) for measuring the latitude and the longitude of a place where the vessel 300 exists, a magnetic azimuth sensor for measuring the azimuth AZ of the vessel 300, and the like; however, the configuration of the sensor group 200 is not limited this one; the sensor group 200 may be the one provided with a so-called well-known inertial navigation system in which there are provided a gyroscope for measuring the angular velocity at which the vessel 300 pivots, an acceleration sensor for measuring the translational acceleration, which is the acceleration of translational motion of the vessel 300, and the like. The sensor group 200 outputs sensor group information sgi including at least an actual angular velocity aav, an actual azimuth aaz, and a vessel speed ss.

The vessel-azimuth control apparatus 1A according to Embodiment 1 is provided with an azimuth command generator 10A, an azimuth controller 20A, an angular velocity controller 30A, and a vibration suppression controller 40A. Hereinafter, the respective functions of and the input/output relationships among the azimuth command generator 10A, the azimuth controller 20A, the angular velocity controller 30A, and the vibration suppression controller 40A that are provided in the vessel-azimuth control apparatus 1A will be explained in detail.

Based on the azimuth signal az to be outputted from the user interface 600 in response to the vessel operator's operation of the user interface 600, the azimuth command generator 10A generates an azimuth command azc and then outputs the generated azimuth command azc to the azimuth controller 20A, described later. The azimuth command generator 10A generates the azimuth command azc by applying specified processing to the azimuth signal az, which is a discrete raw value that has merely been generated by the user interface 600, and then outputs the azimuth command azc. In this situation, as the processing to be applied to the azimuth signal az, for example, processing through a low-pass filter, a moving average filter, a bandpass filter, or the like can be utilized.

Figure 3A:
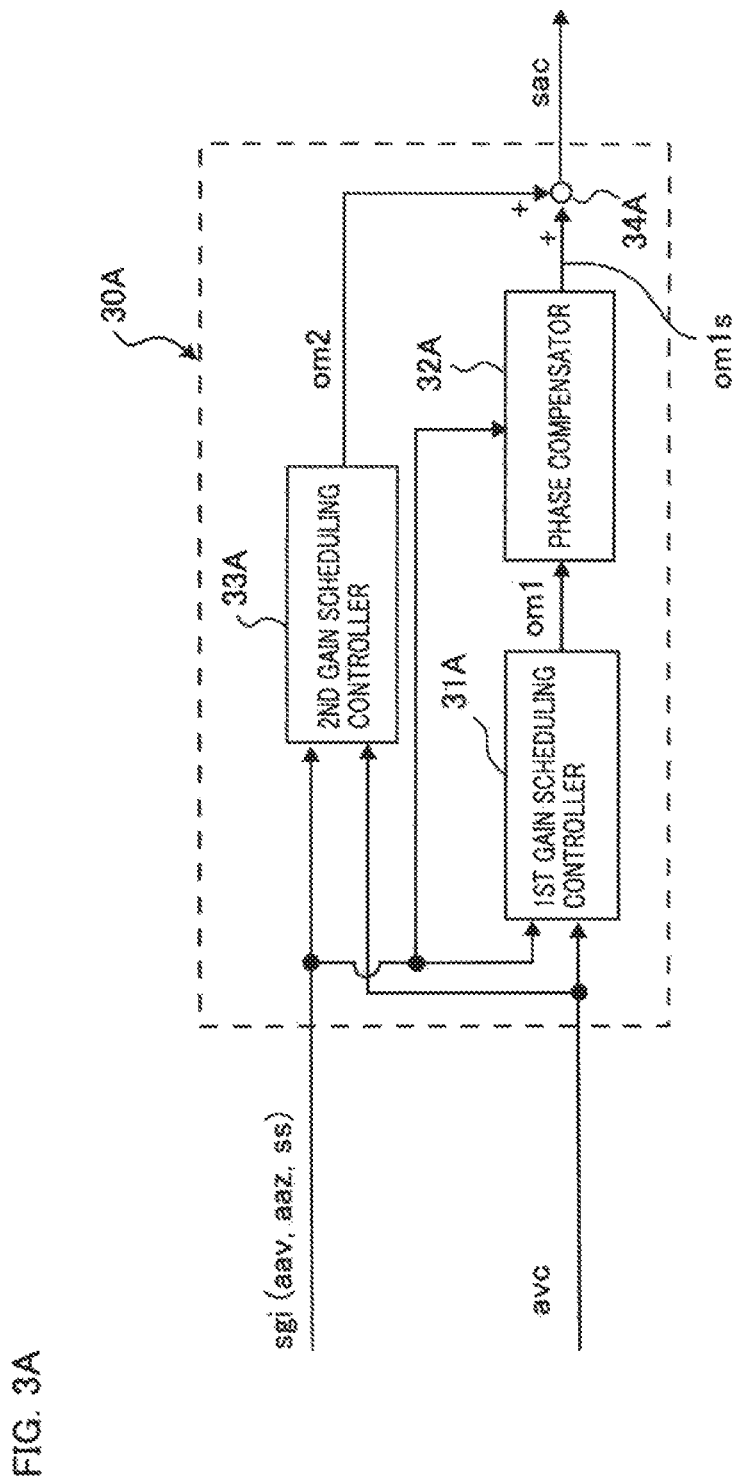
FIG. 3A is a functional block diagram representing the internal configuration of an angular velocity controller in the vessel-azimuth control apparatus according to Embodiment 1.

Next, the angular velocity controller 30A will be explained. FIG. 3A is a functional block diagram representing the internal configuration of the angular velocity controller in the vessel-azimuth control apparatus according to Embodiment 1. As described above, the angular velocity controller 30A represented in FIG. 3A is provided in the azimuth control apparatus 1A. In FIG. 3A, the angular velocity controller 30A is provided with a first gain scheduling controller 31A, a phase compensator 32A, and a second gain scheduling controller 33A. Based on an angular velocity deviation (unillustrated), which is a deviation between an angular velocity command avc and the actual angular velocity aav among the sensor group information items sgi, and the vessel speed ss among the sensor group information items sgi, the first gain scheduling controller 31A performs feedback control in such a way that the foregoing angular velocity deviation becomes zero.

The first gain scheduling controller 31A is formed of, for example, a so-called PID (Proportional Integral Derivative) controller in which a proportional controller, an integral controller, and a differential controller are integrated. In this case, the proportional gain of the proportional controller, the integral gain of the integral controller, and the differential gain of the differential controller in the PID controller are variable gains that each vary in accordance with the foregoing vessel speed ss. In addition, it goes without saying that the first gain scheduling controller 31A may be formed of one of various kinds of controllers such as a PI (Proportional Integral) controller and the like, instead of the foregoing PID controller. Moreover, as preprocessing for the foregoing angular velocity deviation, there may be adopted, for example, dead-zone processing in which in a preliminarily set zone having a small angular velocity deviation, the angular velocity deviation is conveniently made zero.

Based on an open-loop frequency transfer function covering the steering angle control system 100, the vessel 300, and the sensor group 200 mounted in the vessel 300, represented in FIG. 2, the foregoing variable gains of the first gain scheduling controller 31A can systematically be designed without doing trial and error, as described below. Hereinafter, the details of designing of the variable gains of the first gain scheduling controller 31A will be explained.

That is to say, the vessel speed ss of the sailing vessel 300 is made constant; as a steering angle command sac, a sinusoidal wave is given; the frequency of the sinusoidal wave is swept, so that the frequency response characteristic of the actual steering angle asa to the steering angle command sac and the frequency response characteristic of the actual angular velocity aav to the actual steering angle asa are preliminarily measured. Next, curve approximation is applied to the measurement value of the frequency response characteristic of the actual steering angle asa to the steering angle command sac so as to identify the open-loop frequency transfer function of the actual steering angle asa to the steering angle command sac. Similarly, curve approximation is applied to the measurement value of the frequency response characteristic of the actual angular velocity aav to the actual steering angle asa so as to identify the open-loop frequency transfer function of the actual angular velocity aav to the actual steering angle asa.

Then, the vessel speed ss is changed to each of different vessel speeds up to a necessary number of times; the vessel 300 is made to perform constant-speed sailing at each of the changed vessel speeds; then, for each of the vessel speeds, the frequency response characteristic of the actual steering angle asa to the steering angle command sac, as an parameter, is identified in such a manner as described above, and the open-loop frequency transfer function of the actual angular velocity aav to the actual steering angle asa is identified. In such a manner as described above, for each of the changed vessel speeds, the frequency transfer function of the actual steering angle asa to the steering angle command sac and the frequency transfer function of the actual angular velocity aav to the actual steering angle asa in the subject vessel 300 are obtained offline.

In addition, attention should be paid to a fact that in order to make it clear that the steering angle command sac utilized in the foregoing measurement is not a steering angle command at a time when feedback control is performed, the "final steering angle command fsac" is not utilized but the "steering angle command sac" is utilized. In other words, attention should be paid to a fact that this "steering angle command sac" is not the result of a calculation by the azimuth control apparatus 1A but a sinusoidal wave to be directly applied to the steering angle control system 100. Moreover, it is also made possible that as the signal shape of the steering angle command sac to be utilized in the measurement, a signal, such as a rectangular wave or an M-sequence, having sufficient power in a frequency band to be considered by a designer is utilized instead of the foregoing sinusoidal wave.

Next, based on the foregoing frequency transfer function of the actual steering angle asa to the steering angle command sac and the foregoing frequency transfer function of the actual angular velocity aav to the actual steering angle asa that have been obtained offline, the type (a PID controller, a PI controller, or the like) of the angular velocity controller 30A, to be determined by the designer, an angular velocity control band, and a normative closed-loop transfer function for the coverage from the angular velocity command avc to the actual angular velocity aav are determined in such a way that the closed-loop transfer function of an angular velocity control system, i.e., the control system covering from the angular velocity command avc to the actual angular velocity aav among the sensor group information items sgi has a desired characteristic; then, the gain of the first gain scheduling controller 31A is uniquely determined for each of the vessel speeds ss, by use of a gain designing method such as the partial model matching method or the pole placement method, which is a well-known technology.

The first gain scheduling controller 31A that has obtained the gain for each of the vessel speeds ss in such a manner as described above performs feedback control in such a way as to make the actual angular velocity aav fully keep track of the angular velocity command avc so that the angular velocity deviation becomes zero, based on the angular velocity command avc, which is the output of the azimuth controller 20A, described later, and the vessel speed ss among the sensor group information items sgi; then, the first gain scheduling controller 31A outputs a first operation amount om1, as the output thereof. The variable gain of the first gain scheduling controller 31A may be given as either a function of the vessel speed ss or a map in which the vessel speed ss and the gain correspond to each other in a one-to-one relationship.

Next, the phase compensator 32A will be explained. In FIG. 3A, the phase compensator 32A is configured in such a way as to receive the vessel speed ss among the sensor group information items sgi, which are the outputs of the sensor group 200, and the first operation amount om1, which is the output of the first gain scheduling controller 31A, and to output an output om1s obtained by advancing the phase of the first operation amount om1 by a predetermined phase. As described above, the motion of the vessel 300 changes depending on the vessel speed ss; a change in the motion of the vessel 300 strongly appears in the foregoing open-loop frequency transfer function. In particular, in a low-vessel-speed speed region where even when steering is performed, it is difficult to change the azimuths, the open-loop gain is extremely low, in general; therefore, a phase delay of the actual angular velocity aav with respect to the angular velocity command avc needs to be reduced so as to become equal to a phase delay in a speed region other than the low-vessel-speed speed region.

Accordingly, the phase compensator 32A is configured, for example, in such a way that the internal parameter thereof is a variable parameter that varies in accordance with the vessel speed ss. This variable parameter is set in such a way as to advance the phase of the first operation amount om1 only in the low-vessel-speed speed region where it is particularly required to reduce a phase delay and in such a way as to let the first operation amount om1 pass, as it is, in a speed region other than the low-vessel-speed speed region so that the phase of the first operation amount om1 is not advanced, i.e., the series-coupling gain becomes "1".

The internal parameter of the phase compensator 32A may be given as either a function of the vessel speed ss or a map in which the vessel speed ss and the parameter correspond to each other in a one-to-one relationship. Moreover, in the case where phase advancement is required in a region other than the low-vessel-speed speed region, the variable parameter can be set in such a way as to perform phase advancement even in that speed region. Furthermore, the specific configuration of the phase compensator 32A may be an arbitrary configuration, such as a so-called well-known phase lead compensation element or a series couple of a phase lead compensation element and a phase lag compensation element, as long as it is a configuration of a phase compensation element that provides a phase compensation effect to the first operation amount om1 only in a predetermined speed region.

Next, the second gain scheduling controller 33A will be explained. In FIG. 3A, the second gain scheduling controller 33A receives the vessel speed ss among the sensor group information items sgi, which are the outputs of the sensor group 200, and the angular velocity command avc, which is the output of the azimuth controller 20A, described later, and then outputs, as a second operation amount om2, a steering angle command for satisfying the foregoing angular velocity command avc in feed-forward control. Specifically, as the internal gain of the second gain scheduling controller 33A, there is given the gain of an inverse model of a frequency transfer function approximating the frequency response characteristic for the coverage from the actual steering angle asa to the actual angular velocity aav. Alternatively, it may be allowed that there is given the gain of an inverse model of the frequency transfer function for the coverage from an addition point 34A, at which the second operation amount om2 is added to the output om1s of the phase compensator 32A, to the sensor group 200. The gain of each of these inverse models is a variable gain that varies in accordance with the vessel speed ss.

The variable gain of the second gain scheduling controller 33A can systematically be designed without doing trial and error, through a procedure the same as that for the foregoing first gain scheduling controller 31A. The details thereof will be explained below. That is to say, the vessel speed ss of the sailing vessel 300 is made constant; as a steering angle command sac, a sinusoidal wave is given; the frequency of the sinusoidal wave is swept, so that the frequency response characteristic of the actual steering angle asa to the steering angle command sac and the frequency response characteristic of the actual angular velocity aav to the actual steering angle asa are preliminarily measured. Next, curve approximation is applied to the measurement value of the frequency response characteristic of the actual steering angle asa to the steering angle command sac so as to identify the open-loop frequency transfer function of the actual steering angle asa to the steering angle command sac. Similarly, curve approximation is applied to the measurement value of the frequency response characteristic of the actual angular velocity aav to the actual steering angle asa so as to identify the open-loop frequency transfer function of the actual angular velocity aav to the actual steering angle asa.

Then, the vessel speed ss is changed to each of different vessel speeds up to a necessary number of times; the vessel 300 is made to perform constant-speed sailing at each of the changed vessel speeds; then, for each of the vessel speeds, the frequency response characteristic of the actual steering angle asa to the steering angle command sac, as an parameter, is identified in such a manner as described above, and the open-loop frequency transfer function of the actual angular velocity aav to the actual steering angle asa is identified. In such a manner as described above, for each of the changed vessel speeds, the frequency transfer function of the actual steering angle asa to the steering angle command sac and the frequency transfer function of the actual angular velocity aav to the actual steering angle asa in the subject vessel 300 are obtained offline.

In addition, attention should be paid to a fact that in order to make it clear that the steering angle command sac utilized in the foregoing measurement is not a steering angle command at a time when feedback control is performed, the "final steering angle command fsac" is not utilized but the "steering angle command sac" is utilized. In other words, attention should be paid to a fact that this "steering angle command sac" is not the result of a calculation by the azimuth control apparatus 1A but a sinusoidal wave to be directly applied to the steering angle control system 100. Moreover, it is also made possible that as the signal shape of the steering angle command sac to be utilized in the measurement, a signal, such as a rectangular wave or an M-sequence, having sufficient power in a frequency band to be considered by a designer is utilized instead of the foregoing sinusoidal wave.

Next, based on the foregoing frequency transfer function of the actual steering angle asa to the steering angle command sac and the foregoing frequency transfer function of the actual angular velocity aav to the actual steering angle asa that have been obtained offline, the internal gain of the second gain scheduling controller 33A is uniquely determined for each of the vessel speeds, for example, through a gain designing method such as the partial model matching method or the pole placement method in such a way that the closed-loop transfer function of a control system, as an angular velocity control system, covering from the angular velocity command avc to the actual angular velocity aav among the sensor group information items sgi, which are the outputs of the sensor group 200, becomes "1", i.e., in such a way that it is satisfied that the actual angular velocity aav fully keeps track of the angular velocity command avc.

The second gain scheduling controller 33A that has obtained the gain for each of the vessel speeds ss in such a manner as described above performs feed-forward control in such a way as to make the actual angular velocity aav fully keep track of the angular velocity command avc, based on the angular velocity command avc, which is the output of the azimuth controller 20A, described later, and the vessel speed ss among the sensor group information items sgi; then, the second gain scheduling controller 33A outputs the second operation amount om2, as the output thereof. The variable gain of the second gain scheduling controller 33A may be given as either a function of the vessel speed ss or a map in which the vessel speed ss and the gain correspond to each other in a one-to-one relationship.

Figure 3B:
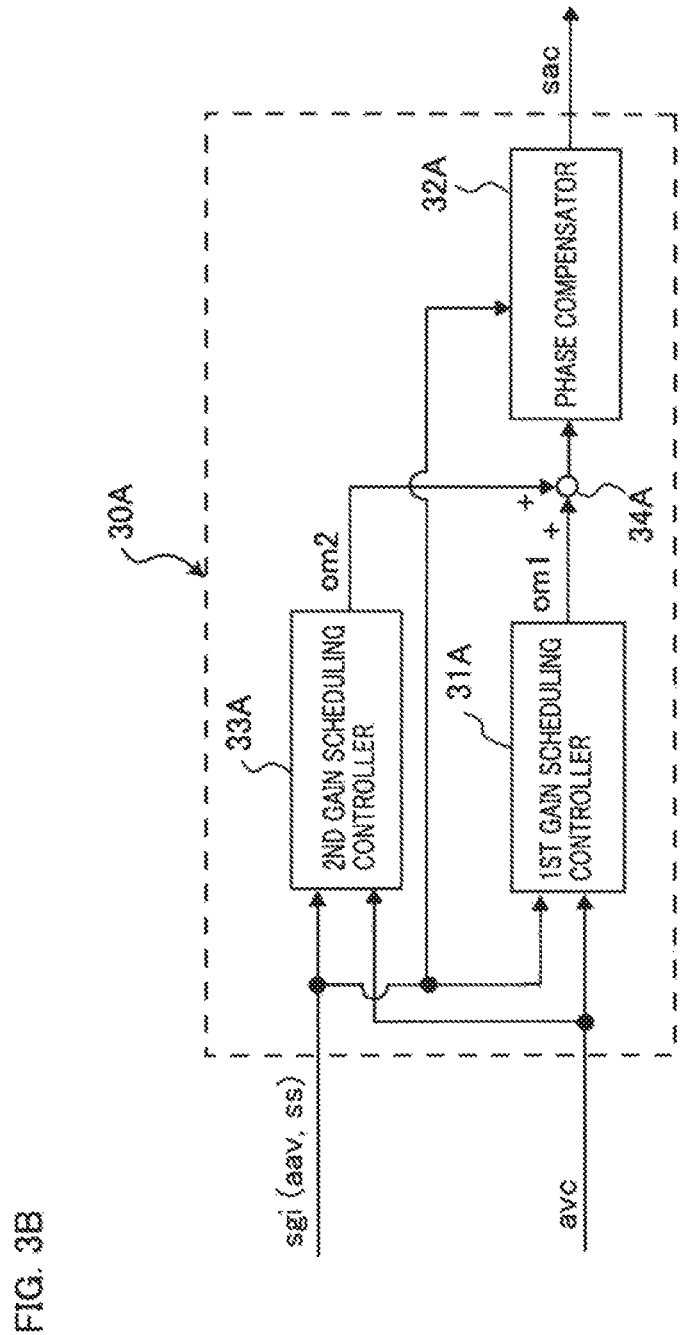
FIG. 3B is a functional block diagram representing another configuration example of the internal configuration of the angular velocity controller in the vessel-azimuth control apparatus according to Embodiment 1.

FIG. 3B is a functional block diagram representing another configuration example of the internal configuration of the angular velocity controller in the vessel-azimuth control apparatus according to Embodiment 1. The different point between the angular velocity controller 30A represented in FIG. 3B and the angular velocity controller 30A represented in foregoing FIG. 3A is that the phase compensator 32A in FIG. 3B is disposed in a stage following the addition point 34A where the first operation amount om1, which is the output of the first gain scheduling controller 31A, and the second operation amount om2, which is the output of the second gain scheduling controller 33A, are added. In this case, as the first gain scheduling controller 31A represented in FIG. 3B, the first gain scheduling controller 31A represented in FIG. 3A can be utilized, as it is.

In addition, as the internal gain of the second gain scheduling controller 33A in FIG. 3B, as is the case with the internal gain of the second gain scheduling controller 33A in FIG. 3A, there may be given the gain of an inverse model of a frequency transfer function approximating the frequency response characteristic for the coverage from the actual steering angle asa to the actual angular velocity aav; alternatively, it may be allowed that there is given the gain of an inverse model of the frequency transfer function for the coverage from an addition point 34A, at which the second operation amount om2 is added to the output om1s of the phase compensator 32A, to the sensor group 200. The gain of each of these inverse models is a variable gain that varies in accordance with the vessel speed ss.

The respective internal calculations of the first gain scheduling controllers 31A in FIGS. 3A and 3B are one and the same, and the respective internal calculations of the phase compensators 32A in FIGS. 3A and 3B are one and the same; however, the internal calculation of the second gain scheduling controller 33A in FIG. 3A is more simply configured than the internal calculation of the second gain scheduling controller 33A in FIG. 3B.

Configuring the angular velocity controller 30A in such a manner as represented in foregoing FIG. 3A or 3B makes it possible to construct an angular velocity control system that always has a constant angular velocity control band without depending on the vessel speed ss, even when the dynamic characteristic of the vessel 300 varies depending on the vessel speed ss.

Figure 4:
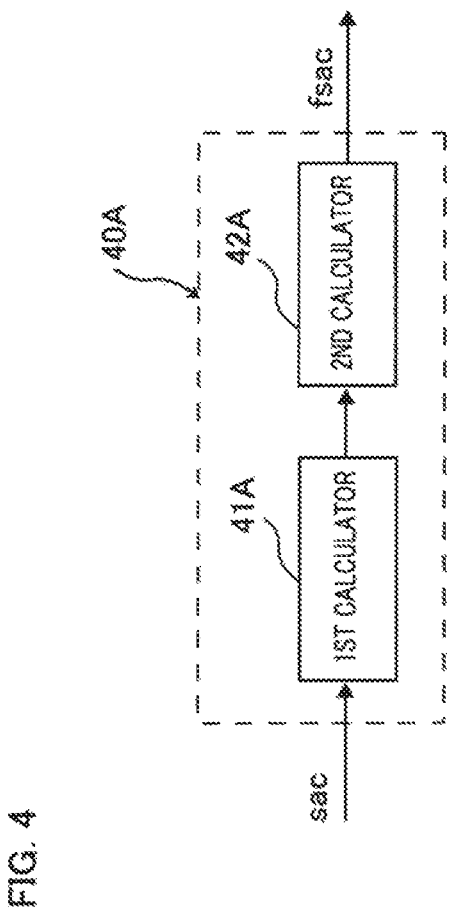
FIG. 4 is a functional block diagram representing the internal configuration of a vibration suppression controller in the vessel-azimuth control apparatus according to Embodiment 1.

Next, the vibration suppression controller 40A in the vessel-azimuth control apparatus according to Embodiment 1 will be explained. FIG. 4 is a functional block diagram representing the internal configuration of the vibration suppression controller in the vessel-azimuth control apparatus according to Embodiment 1. In FIG. 4, the vibration suppression controller 40A receives the steering angle command sac, which is the output of the foregoing angular velocity controller 30A, and then outputs the final steering angle command fsac to the steering angle control system 100. The vibration suppression controller 40A includes a first calculator 41A and a second calculator 42A. The first calculator 41A includes a filter that topically attenuates only an AC main component, outside the angular velocity control band, that is superimposed on the steering angle command sac; for example, the first calculator 41A includes a notch filter whose center frequency corresponds to the AC main component outside the angular velocity control band.

The second calculator 42A includes a filter that attenuates an AC subcomponent, outside the angular velocity control band, that is superimposed on the steering angle command sac; for example, the second calculator 42A includes a lowpass filter. The first calculator 41A is not limited to the foregoing notch filter; any kind of filter can be utilized as long as it has a function of attenuating only the AC main component; for example, an arbitrary configuration such as a bandpass filter can be adopted. The second calculator 42A may be any kind of filter, as long as it has a function of attenuating the AC subcomponent; for example, an arbitrary configuration such as a lowpass filter whose order is 1 or larger can be adopted.

The parameters of each of the respective filters included in the first calculator 41A and the second calculator 42A can uniquely be designed in such a manner as described below. That is to say, the vessel speed ss of the sailing vessel 300 is made constant; as a steering angle command sac, a sinusoidal wave is given; the frequency of the sinusoidal wave is swept, so that the frequency response characteristic of the actual steering angle asa to the steering angle command sac and the frequency response characteristic of the actual angular velocity aav to the actual steering angle asa are preliminarily measured. Next, curve approximation is applied to the measurement value of the frequency response characteristic of the actual steering angle asa to the steering angle command sac so as to identify the open-loop frequency transfer function of the actual steering angle asa to the steering angle command sac. Similarly, curve approximation is applied to the measurement value of the frequency response characteristic of the actual angular velocity aav to the actual steering angle asa so as to identify the open-loop frequency transfer function of the actual angular velocity aav to the actual steering angle asa.

Then, the vessel speed ss is changed to each of different vessel speeds up to a necessary number of times; the vessel 300 is made to perform constant-speed sailing at each of the changed vessel speeds; then, for each of the vessel speeds, the frequency response characteristic of the actual steering angle asa to the steering angle command sac, as an parameter, is identified in such a manner as described above, and the open-loop frequency transfer function of the actual angular velocity aav to the actual steering angle asa is identified. In such a manner as described above, for each of the changed vessel speeds, the frequency transfer function of the actual steering angle asa to the steering angle command sac and the frequency transfer function of the actual angular velocity aav to the actual steering angle asa in the subject vessel 300 are obtained offline.

In addition, attention should be paid to a fact that in order to make it clear that the steering angle command sac utilized in the foregoing measurement is not a steering angle command at a time when feedback control is performed, the "final steering angle command fsac" is not utilized but the "steering angle command sac" is utilized. In other words, attention should be paid to a fact that this "steering angle command sac" is not the result of a calculation by the azimuth control apparatus 1A but a sinusoidal wave to be directly applied to the steering angle control system 100. Moreover, it is also made possible that as the signal shape of the steering angle command sac to be utilized in the measurement, a signal, such as a rectangular wave or an M-sequence, having sufficient power in a frequency band to be considered by a designer is utilized instead of the foregoing sinusoidal wave.

Next, in the frequency transfer function of the actual steering angle asa to the steering angle command sac and the frequency transfer function of the actual angular velocity aav to the actual steering angle asa that have been obtained offline, there is extracted a frequency that is outside the angular velocity control band and at which the phase of a peak gain is delayed; then, the frequency at which the peak gain appears at most is apprehended as an AC main component, so that the parameters related to the center frequency, the notch damping ratio, and the notch depth of the filter included in the first calculator 41A can uniquely be determined.

Taking the results of sailing tests in all kinds of vessels into account, two or more AC subcomponents for determining the parameters of the filter included in the second calculator 42A may exist in a frequency band higher than that of the AC main component; therefore, the parameters of the filter included in the second calculator 42A can uniquely be determined by regarding the foregoing AC main component as the cut-off frequency, for example, as a lowpass filter whose order is 1 or larger.

In such a way as described above, the parameters of each of the respective filters included in the first calculator 41A and the second calculator 42A can be fixed values regardless of the vessel speed ss.

Meanwhile, it is conceivable that the frequency band of the peak gain changes for each of the vessel speeds ss or the value of the peak gain changes depending on the tendencies of the frequency transfer function of the actual steering angle asa to the steering angle command sac and the frequency transfer function of the actual angular velocity aav to the actual steering angle asa, for each of the vessel speeds ss, that have been obtained offline. In that case, it may be allowed that the parameters of each of the respective filters included in the first calculator 41A and the second calculator 42A are not made to be fixed values for all of the speed region but are given with reference to the vessel speed ss, as functions of the vessel speed ss among the sensor group information items sgi or maps, in each of which the vessel speed ss and the parameter correspond to each other in a one-to-one relationship.

Furthermore, with regard to the vibration suppression controller 40A, in the case where it is difficult to distinguish the AC subcomponent from the AC main component—the AC subcomponent and the AC main component are outside the angular velocity control band and are superimposed on the steering angle command sac—and two or more components of the same magnitude exist, it may be allowed that two or more first calculators 41A having different center frequencies, different notch damping ratios, and different notch depths are connected in series with one another, in such a way as to correspond to the respective frequencies of the foregoing AC components; alternatively, in the case where only the AC main component is distinct and hence only the vibration of the frequency band thereof poses a problem in terms of the sailing comfort, it may be allowed that only a single first calculator 41A for attenuating the AC main component is included. Moreover, with regard to the vibration suppression controller 40A, in the case where it is difficult to distinguish the AC subcomponent from the AC main component—the AC subcomponent and the AC main component are outside the angular velocity control band and are superimposed on the steering angle command sac—and two or more components of the same magnitude exist, it may be allowed that there is included only a single second calculator 42A that attenuates AC subcomponent set at a cut-off frequency that is slightly lower than the frequency of an AC component whose frequency is the lowest.

Configuring the vibration suppression controller 40A in such a manner as described above makes it possible to suppress a vibration, outside the angular velocity control band, that is a hindrance at a time when an azimuth is held or azimuths are changed, and to realize angular velocity control that is stable in all of the vessel speed region in which the vessel 300 sails.

Next, the azimuth controller 20A illustrated in FIG. 2 will be explained. The azimuth controller 20A performs feedback-control in such a way that an azimuth deviation (unillustrated) corresponding to the difference between the azimuth command azc, which is the output of the azimuth command generator 10A, and an actual azimuth (unillustrated) among the sensor group information items sgi becomes zero. The azimuth controller 20A may have one of various kinds of structures such as those of a PID controller and the like.

As described above, the angular velocity control band of the angular velocity control system including the angular velocity controller 30A is constant regardless of the vessel speed ss; thus, the gain of the azimuth controller 20A can uniquely be obtained regardless of the vessel speed ss, in such a way that the closed-loop transfer function for the coverage from the azimuth command azc to the actual azimuth becomes to have a desired characteristic, based on the azimuth control band and the normative closed-loop transfer function for the coverage from the azimuth command azc to the actual azimuth that are determined by the designer. Moreover, as preprocessing of the deviation signal representing the foregoing azimuth deviation, there may be adopted, for example, dead-zone processing in which in a preliminarily set zone having a small azimuth deviation, the azimuth deviation is conveniently made zero.

Figure 5:
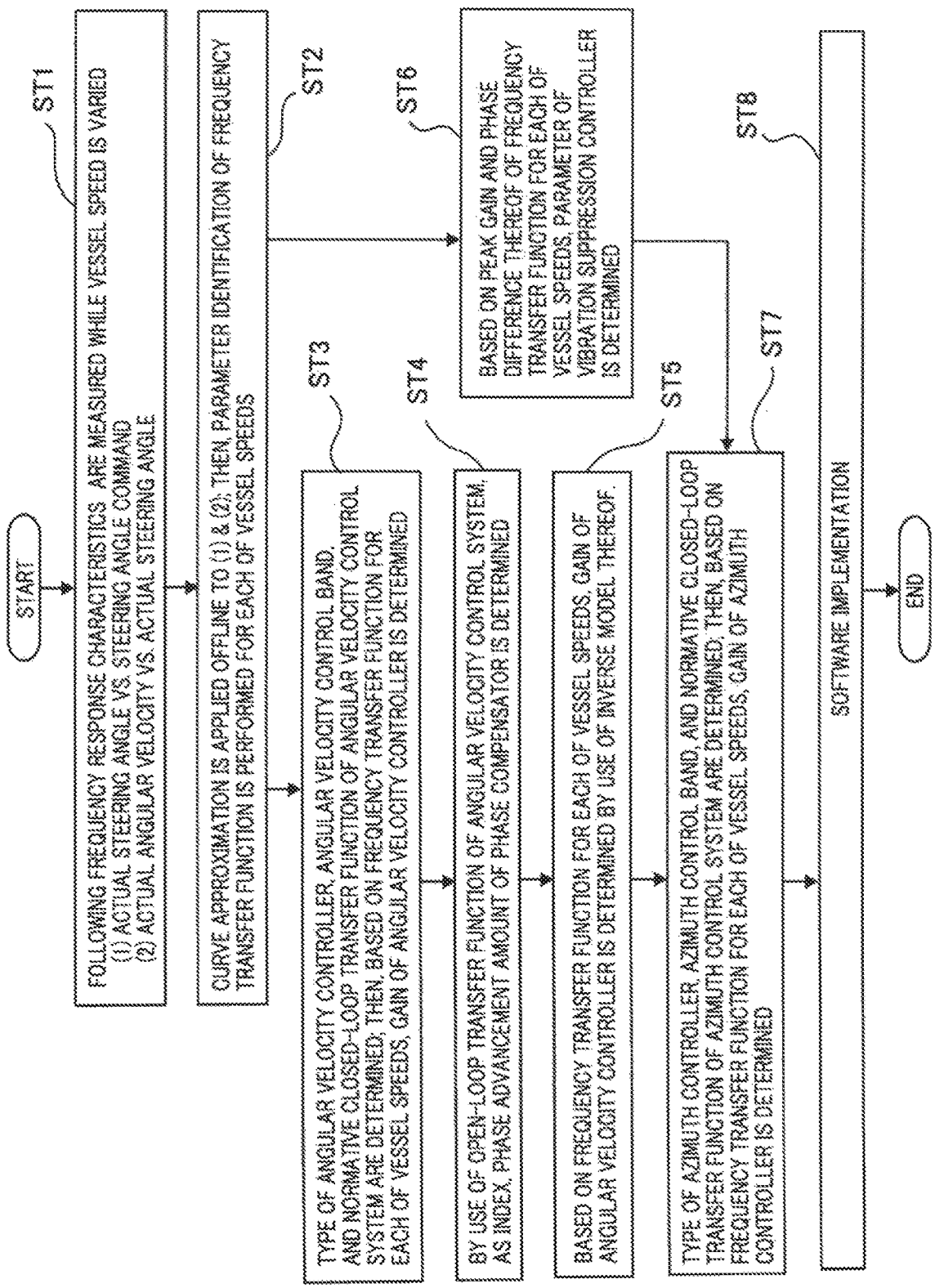
FIG. 5 is a flowchart representing a basic designing procedure in the vessel-azimuth control apparatus according to Embodiment 1.

FIG. 5 is a flowchart representing a basic designing procedure in the vessel-azimuth control apparatus according to Embodiment 1; the flowchart represents the respective basic designing procedures for the angular velocity controller 30A, the vibration suppression controller 40A, and the azimuth controller 20A, described above. In FIG. 5, the contents to be performed in the steps ST1 through ST8 are described below.

<The Step ST1>

The vessel 300 is made to sail at a constant speed, and as a steering angle command sac, a sinusoidal wave is given; (1) the frequency response characteristic of the actual steering angle asa to the steering angle command sac and (2) the frequency response characteristic of the actual angular velocity aav to the actual steering angle asa are preliminarily measured. While the vessel speed is varied, the foregoing measurement for each of the vessel speeds is performed.

<The Step ST2>

Curve approximation is applied offline to (1) the frequency response characteristic of the actual steering angle asa to the steering angle command sac and (2) the frequency response characteristic of the actual angular velocity aav to the actual steering angle asa, which have been measured in the step ST1; then, parameter identification is applied to the respective foregoing frequency transfer functions for each of the vessel speeds.

<The Step ST3>

The type of the angular velocity controller 30A, the angular velocity control band, and the normative closed-loop transfer function of the angular velocity control system are determined; then, based on the frequency transfer functions that have been obtained in the step ST2, the gain of the first gain scheduling controller 31A is determined for each of the vessel speeds.

<The Step ST4>

As an index, the open-loop transfer function, obtained in the step ST3, of the angular velocity control system including the first gain scheduling controller 31A is utilized, so that a phase advancement amount in the vessel speed and the frequency band in which phase advancement is required is determined; then, the parameters of the phase compensator 32A are determined, as fixed values independent from the vessel speed ss or as variable parameters for each of the vessel speeds.

<The Step ST5>

The gain of the second gain scheduling controller 33A is determined for each of the vessel speeds in such a way that the closed-loop transfer function, of the angular velocity control system including the first gain scheduling controller 31A and the phase compensator 32A, that has been determined in the steps before and including the step ST4, i.e., the closed-loop transfer function for the coverage from the angular velocity command avc to the actual angular velocity aav among the sensor group information items sgi, which is the outputs of the sensor group 200, becomes "1", i.e., in such a way that the actual angular velocity aav fully keeps track of the angular velocity command avc. For example, based on the frequency transfer function for each of the vessel speeds, the foregoing gain is determined by use of an inverse model thereof.

<The Step ST6>

Based on the frequency transfer function of the actual steering angle asa to the steering angle command sac and the frequency transfer function of the actual angular velocity aav to the actual steering angle asa for each of the vessel speeds, which have been identified in the step ST2, there are extracted the peak gain outside the angular velocity control band and the phase difference thereof; then, the parameters of the vibration suppression controller 40A for suppressing that peak gain are determined, as fixed values independent from the vessel speed ss or as variable parameters for each of the vessel speeds.

<The Step ST7>

The type of the azimuth controller 20A, the azimuth control band, and the normative closed-loop transfer function of the azimuth control system are determined; then, based on the frequency transfer functions that have been obtained in the step ST2 and the closed-loop transfer function of the angular velocity control system including the angular velocity controller 30A, the phase compensator 32A, and the vibration suppression controller 40A, the gain of the azimuth controller 20A is determined, as fixed values independent from the vessel speed ss.

<The Step ST8>

Software implementation of the angular velocity controller 30A, the vibration suppression controller 40A, and the azimuth controller 20A are performed.

Embodiment 1 described above includes at least the configurations below.

(1) A vessel-azimuth control apparatus that has a steering angle control system for controlling a steering angle of a vessel, based on a command for controlling a steering angle, that is provided in a vessel control apparatus that steers the vessel, based on control of the steering, and that has a function of making the vessel sail while holding a desired azimuth or making the vessel sail while changing an azimuth to a desired one, the vessel-azimuth control apparatus comprising:

an azimuth command generator that converts an azimuth signal generated through operation of a user interface into an azimuth command and then outputs the azimuth command;

an azimuth controller that generates and outputs an angular velocity command, based on the azimuth command;

an angular velocity controller that generates and outputs a steering angle command, based on the angular velocity command; and a vibration suppression controller that suppresses a vibration component superimposed on the steering angle command and existing outside an angular velocity control band and that generates and outputs a final steering angle command, wherein the final steering angle command is provided, as a command for controlling the steering angle, to the steering angle control system.

This configuration makes it possible to generate an outboard-motor final steering angle command required for making a vessel hold an azimuth or change an azimuth without being vibrated.

(2) The angular velocity controller includes a first gain scheduling controller that generates and outputs a first operation amount, based on a deviation between an angular velocity command and an actual angular velocity and a gain that varies in accordance with a vessel speed among sensor group information items outputted from a sensor group provided in the vessel, a phase compensator that advances a phase of the first operation amount by a predetermined amount and outputs the first operation amount, based on the first operation amount and the vessel speed among the sensor group information items, and a second gain scheduling controller that generates and outputs a second operation amount, based on the angular velocity command and a variable gain that varies in accordance with the vessel speed among the sensor group information items; the angular velocity controller is configured in such a way that an output of the phase compensator and the second operation amount are added so that the steering angle command is generated.

This configuration makes it possible that even when the vessel speed changes, the angular velocity control band does not vary and hence an always constant angular velocity control response is realized.

(3) Each of respective gains of the first gain scheduling controller and the second gain scheduling controller are uniquely determined, based on a preliminarily obtained frequency response characteristic, for each of two or more different vessel speeds, that has a coverage from a steering angle command to an actual steering angle at a time when the vessel is made to perform constant-speed sailing at each of the different vessel speeds, a preliminarily obtained frequency response characteristic, for each of two or more different vessel speeds, that has a coverage from the actual steering angle to an actual angular velocity at a time when the vessel is made to perform constant-speed sailing at each of the different vessel speeds, a design value in the angular velocity control band, and a normative closed-loop transfer function of an angular velocity control system in the angular velocity controller; the gain is a variable gain that is given as a function of the vessel speed or a map for a predetermined vessel speed.

This configuration makes it possible that even when the vessel speed changes, the angular velocity control band does not vary and hence an always constant angular velocity control response is realized.

(4) In a predetermined speed region, the phase compensator advances a phase of the steering angle command outputted from the angular velocity controller, based on a preliminarily obtained frequency response characteristic, for each of two or more different vessel speeds, that has a coverage from a steering angle command to an actual steering angle at a time when the vessel is made to perform constant-speed sailing at each of the different vessel speeds, and a preliminarily obtained frequency response characteristic, for each of two or more different vessel speeds, that has a coverage from the actual steering angle to an actual angular velocity at a time when the vessel is made to perform constant-speed sailing at each of the different vessel speeds; a parameter of the phase compensator is given as a fixed value in all of a vessel speed region, a function of the vessel speed among the sensor group information items, or a map.

This configuration makes it possible that a phase delay, at a predetermined vessel speed, in the output of the angular velocity controller is reduced and hence the angular velocity control system is stabilized.

(5) The vibration suppression controller includes a first calculator that attenuates an AC main component, outside the angular velocity control band, that is superimposed on the steering angle command outputted from the angular velocity controller, and a second calculator that attenuates an AC subcomponent, outside the angular velocity control band, that is superimposed on an output of the first calculator; each of respective parameters of the first calculator and the second calculator is given as a fixed value in all of a vessel speed region, a function of the vessel speed among the sensor group information items, or a map, based on a preliminarily obtained frequency response characteristic, for each of two or more different vessel speeds, that has a coverage from a steering angle command to an actual steering angle at a time when the vessel is made to perform constant-speed sailing at each of the different vessel speeds, and a preliminarily obtained frequency response characteristic, for each of two or more different vessel speeds, that has a coverage from the actual steering angle to an actual angular velocity at a time when the vessel is made to perform constant-speed sailing at each of the different vessel speeds.

This configuration makes it possible to suppress a vibration, outside the angular velocity control band, that is a hindrance at a time when an azimuth is held or azimuths are changed, and to perform angular velocity control that is stable in all of the vessel speed region.

(6) The vibration suppression controller includes only one of a first calculator that attenuates an AC main component, outside the angular velocity control band, that is superimposed on the steering angle command, and a second calculator that attenuates an AC subcomponent, outside the angular velocity control band, that is superimposed on the steering angle command; a parameter of any one of the calculators included in the vibration suppression controller is given as a fixed value in all of a vessel speed region, a function of the vessel speed among the sensor group information items, or a map, based on a preliminarily obtained frequency response characteristic, for each of two or more different vessel speeds, that has a coverage from a steering angle command to an actual steering angle at a time when the vessel is made to perform constant-speed sailing at each of the different vessel speeds, and a preliminarily obtained frequency response characteristic, for each of two or more different vessel speeds, that has a coverage from the actual steering angle to an actual angular velocity at a time when the vessel is made to perform constant-speed sailing at each of the different vessel speeds.

This configuration makes it possible to simplify a calculation for suppressing a vibration.

Embodiment 1 includes at least the method below.

(7) A vessel-azimuth controlling method for making a vessel sail while holding a desired azimuth or while changing an azimuth to a desired one, the vessel-azimuth controlling method comprising the steps of:

converting an azimuth signal obtained through operation of an user interface into an azimuth command;

generating an angular velocity command for making a deviation between the azimuth command and an actual azimuth zero;

generating a steering angle command for making a deviation between the angular velocity command and an actual angular velocity zero;

generating a final steering angle command by attenuating a vibration component superimposed on the steering angle command; and controlling an azimuth of the vessel, based on the final steering angle command.

This method makes it possible to generate an outboard-motor final steering angle command required for making a vessel hold an azimuth or change an azimuth without being vibrated.

The vessel-azimuth control apparatus and the azimuth controlling method according to Embodiment 1 makes it possible that in all of a vessel speed region where a vessel sails, respective control bands of an angular velocity control response and an azimuth control response are made constant regardless of a vessel speed and that stable angular velocity control and azimuth control are realized without amplifying a vibration caused by a disturbance to the vessel, such as a tide or wind, and a characteristic for the coverage from a steering angle control system to the vessel. Moreover, the respective gains and parameters in internal calculations of the angular velocity controller, the vibration suppression controller, and the azimuth controller are uniquely determined by tendencies of the frequency transfer function of an actual steering angle to a steering angle command for each of vessel speeds and the frequency transfer function of an actual angular velocity to an actual steering angle—the foregoing frequency transfer functions are obtained preliminarily and offline —; therefore, because there can be realized a simple configuration in which no such a sequential calculation of a matrix as is disclosed in Patent Document 2 is required, the calculation load on the azimuth control apparatus can be reduced.

Embodiment 2

Figure 6:
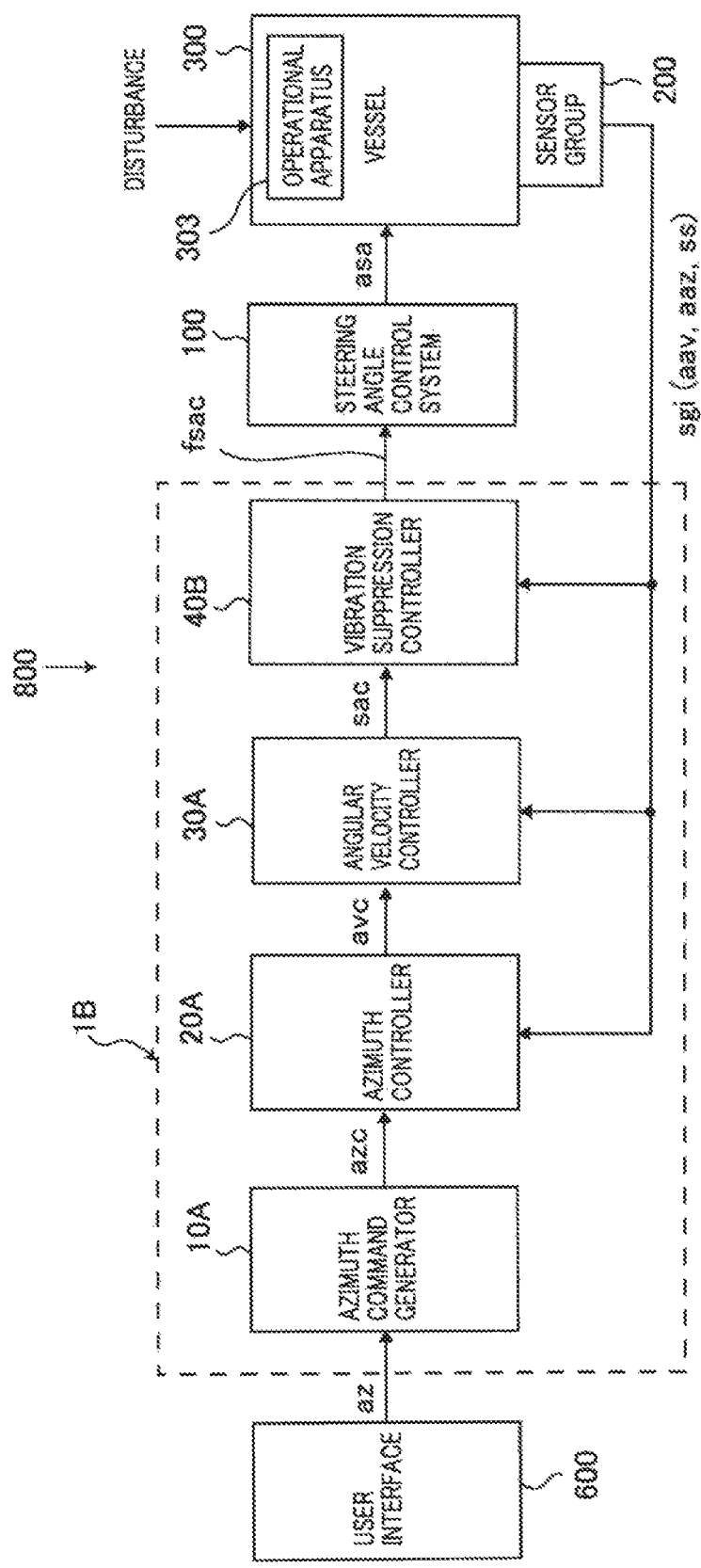
FIG. 6 is a functional block diagram representing the overall configuration of a vessel control apparatus provided with a vessel-azimuth control apparatus according to Embodiment 2.

Next, a vessel-azimuth control apparatus and an azimuth controlling method according to Embodiment 2 will be explained. FIG. 6 is a functional block diagram representing the overall configuration of a vessel control apparatus provided with a vessel-azimuth control apparatus according to Embodiment 2. The configurations of the user interface 600, the vessel 300, the sensor group 200, and the steering angle control system 100 illustrated in FIG. 6 are the same as those in the vessel-azimuth control apparatus according to Embodiment 1, described above; therefore, the explanations therefor will be omitted.

The vessel-azimuth control apparatus 1B according to Embodiment 2 is provided with the azimuth command generator 10A, the azimuth controller 20A, the angular velocity controller 30A, and a vibration suppression controller 40B. The azimuth command generator 10A, the azimuth controller 20A, and the angular velocity controller 30A provided in the azimuth control apparatus 1B are the same as the azimuth command generator 10A, the azimuth controller 20A, and the angular velocity controller 30A, respectively, provided in the azimuth control apparatus 1A according to Embodiment 1. The difference from Embodiment 1 lies in the internal configuration of the vibration suppression controller 40B.

Figure 7:
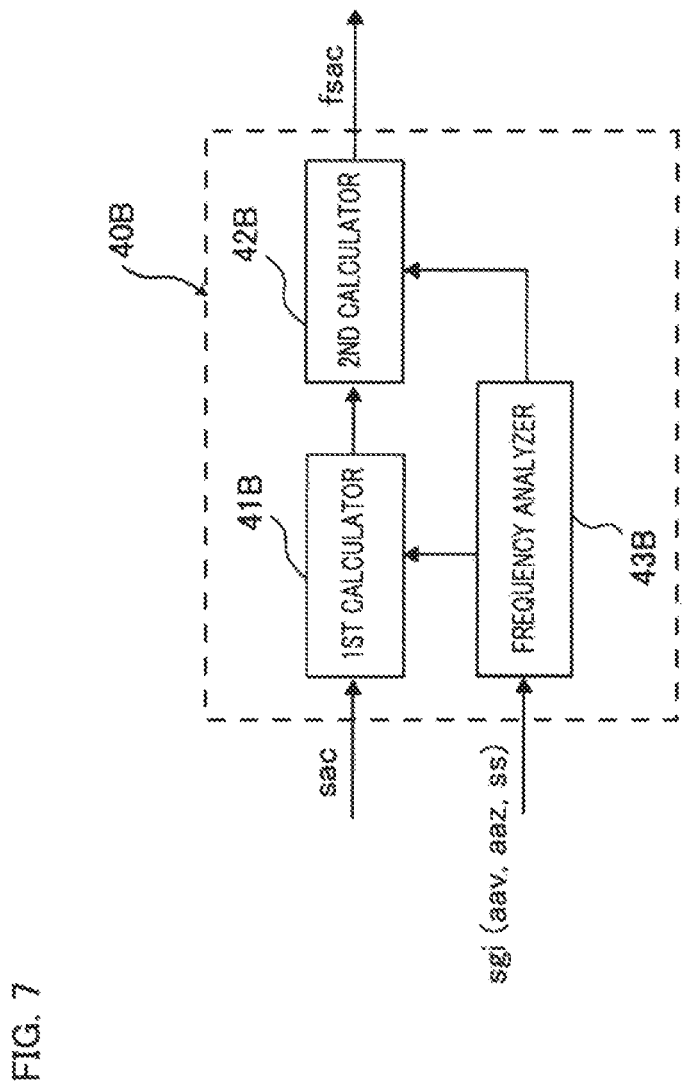
FIG. 7 is a functional block diagram representing the internal configuration of a vibration suppression controller in the vessel-azimuth control apparatus according to Embodiment 2.

Next, the vibration suppression controller 40B will be explained in detail. FIG. 7 is a functional block diagram representing the internal configuration of the vibration suppression controller in the vessel-azimuth control apparatus according to Embodiment 2. In FIG. 7, the vibration suppression controller 40B receives the steering angle command sac, which is the output of the foregoing angular velocity controller 30A, and then outputs the final steering angle command fsac to the steering angle control system 100. The vibration suppression controller 40B includes a first calculator 41B, a second calculator 42B, and a frequency analyzer 43B. The vibration suppression controller 40B is different from the vibration suppression controller 40A in Embodiment 1 represented in foregoing FIG. 4 in that the frequency analyzer 43B is added thereto.

The frequency analyzer 43B receives a temporal sequence of the actual angular velocities aav among the sensor group information items sgi, and then applies AC-main-component analysis to the temporal sequence of the actual angular velocities aav, by use of well-known frequency analysis algorithm such as fast Fourier transformation. From the frequency and the amplitude of the AC main component, of the actual angular velocity aav, that is obtained by this analysis and is outside the angular velocity control band, the frequency analyzer 43B outputs, to the first calculator 41B, the center frequency, the notch damping ratio, and the notch depth of the AC main component, of the actual angular velocity aav, outside the angular velocity control band. Furthermore, from the frequency and the amplitude of the AC subcomponent, of the actual angular velocity aav, that is obtained by similar analysis and is outside the angular velocity control band, the frequency analyzer 43B outputs the cut-off frequency to the second calculator 42B.

The first calculator 41B receives the frequency and the amplitude of the AC main component outside the angular velocity control band and then adaptively determines the parameters represented by the center frequency, the notch damping ratio, and the notch depth. The second calculator 42B receives the frequency and the amplitude of the AC subcomponent outside the angular velocity control band and then adaptively determines the parameters represented by the cut-off frequency. In the case where two or more first calculators 41B are connected in series with one another, the parameters of each of the series connection elements can adaptively be determined. In the case where two or more second calculators 42B are connected in series with one another, the parameters of each of the series connection elements can adaptively be determined.

In addition, with regard to the vibration suppression controller 40B, in the case where it is difficult to distinguish the AC subcomponent from the AC main component—the AC subcomponent and the AC main component are outside the angular velocity control band and are superimposed on the steering angle command sac—and two or more components of the same magnitude exist, it may be allowed that two or more first calculators 41B having different center frequencies, different notch damping ratios, and different notch depths are connected in series with one another in such a way as to correspond to the respective frequencies of the foregoing AC components; alternatively, in the case where only the AC main component is distinct and hence only the vibration of the frequency band thereof poses a problem in terms of the sailing comfort, it may be allowed that only a single first calculator 41B for attenuating the AC main component is included. Moreover, with regard to the vibration suppression controller 40B, in the case where it is difficult to distinguish the AC subcomponent from the AC main component—the AC subcomponent and the AC main component are outside the angular velocity control band and are superimposed on the steering angle command sac—and two or more components of the same magnitude exist, it may be allowed that there is included only a single second calculator 42B that attenuates AC subcomponent set at a cut-off frequency that is slightly lower than the frequency of an AC component whose frequency is the lowest.

Embodiment 2 described above includes at least the following configurations in addition to the configurations and the methods the same as those in foregoing Embodiment 1.

(8) The vessel-azimuth control apparatus according to any one of claims 1 through 4,
wherein the vibration suppression controller includes
a first calculator that attenuates an AC main component, outside the angular velocity control band, that is superimposed on the steering angle command outputted from the angular velocity controller,
a second calculator that attenuates an AC subcomponent, outside the angular velocity control band, that is superimposed on an output of the first calculator, and a frequency analyzer that extracts vibration components superimposed on an actual angular velocity among sensor group information items outputted from a sensor group provided in the vessel and then outputs a frequency and an amplitude of an AC main component and a frequency and an amplitude of an AC subcomponent outside the angular velocity control band, wherein a parameter of the first calculator is given based on a frequency and an amplitude of an AC main component, outside the angular velocity control band, that is outputted from the frequency analyzer, and wherein a parameter of the second calculator is given based on a frequency and an amplitude of an AC subcomponent, outside the angular velocity control band, that is outputted from the frequency analyzer.

This configuration makes it possible to obtain optimum first and second calculators through sequential application to a vibration component superimposed on an actual angular velocity among sensor group information items.

(9) The vessel-azimuth control apparatus according to any one of claims 1 through 4, wherein the vibration suppression controller includes a calculator that attenuates an AC component, outside an angular velocity control band, that is superimposed on a steering angle command outputted from the angular velocity controller, and a frequency analyzer that extracts vibration components superimposed on an actual angular velocity among sensor group information items outputted from a sensor group provided in the vessel and then outputs a frequency and an amplitude of an AC component outside an angular velocity control band, and wherein a parameter of the calculator is given based on a frequency and an amplitude of an AC component, outside the angular velocity control band, that is outputted from the frequency analyzer.

This configuration makes it possible that an optimum calculator is obtained through sequential application to a vibration component superimposed on an actual angular velocity among sensor group information items and that the calculation for suppressing a vibration is simplified.

As described above, in contrast to the vibration suppression controller 40A in Embodiment 1, Embodiment 2 makes it possible to obtain, as variable parameters, the respective filters of the optimum first and second calculators 41B and 42B through sequential application to a vibration component superimposed on the actual angular velocity aav among the sensor group information items sgi. As a result, in all of vessel speed region where the vessel 300 sails, it is made possible that while the respective control bands of an angular velocity control response and an azimuth control response are made constant, stable angular velocity control and azimuth control are realized without amplifying a vibration caused by a disturbance to the vessel 300, such as a tide or wind, and a characteristic for the coverage from the steering angle control system to the vessel 300.

Embodiment 3

Figure 8:
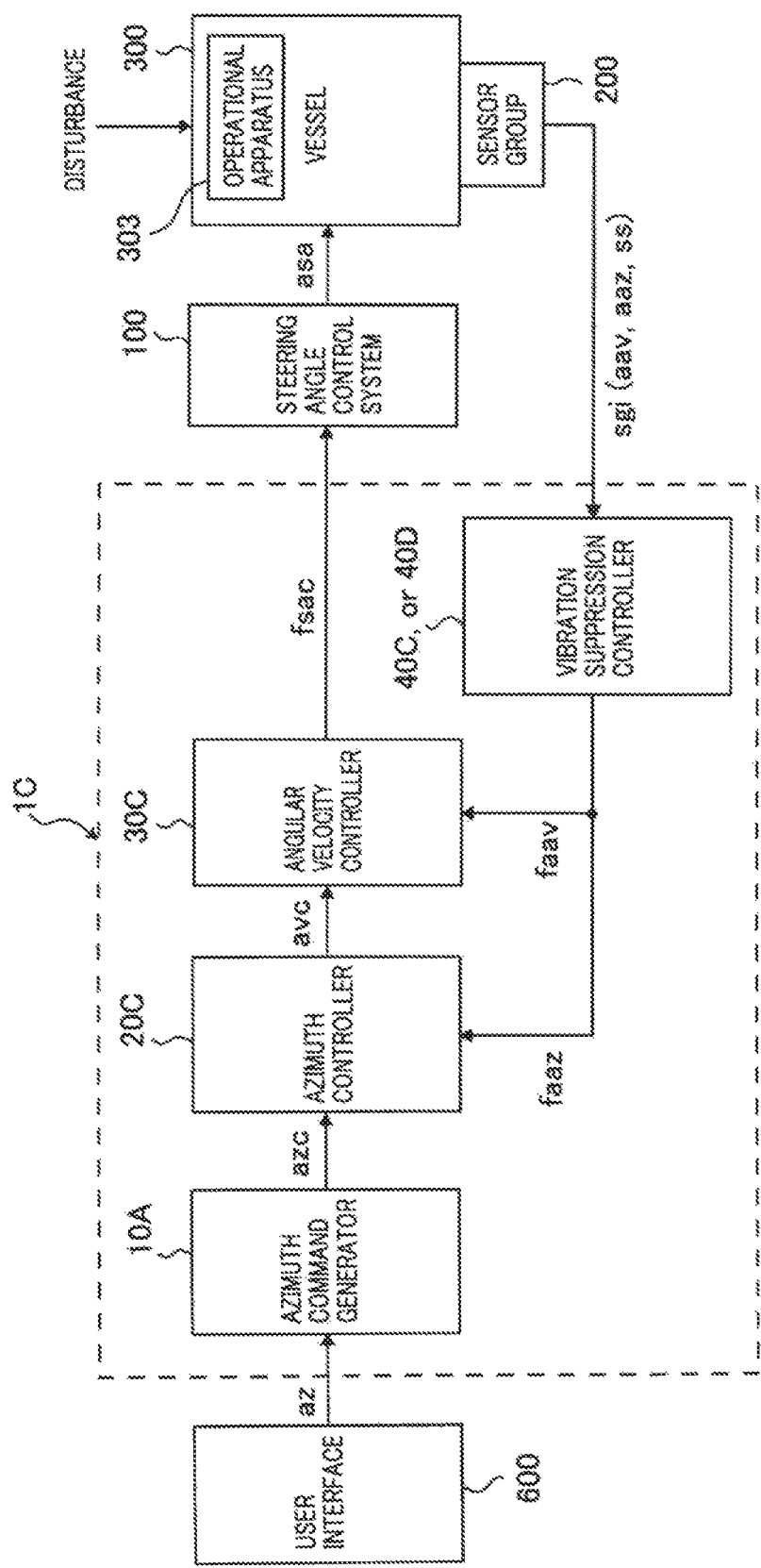
FIG. 8 is a functional block diagram representing the overall configuration of a vessel control apparatus provided with a vessel-azimuth control apparatus according to Embodiment 3.

Next, a vessel-azimuth control apparatus and an azimuth controlling method according to Embodiment 3 will be explained. FIG. 8 is a functional block diagram representing the overall configuration of a vessel control apparatus provided with a vessel-azimuth control apparatus according to Embodiment 3. The configurations of the user interface 600, the vessel 300, the sensor group 200, and the steering angle control system 100 illustrated in FIG. 8 are the same as those in the vessel-azimuth control apparatus according to each of Embodiments 1 and 2, described above; therefore, the explanations therefor will be omitted.

The vessel-azimuth control apparatus 1C according to Embodiment 3 is provided with the azimuth command generator 10A, an azimuth controller 20C, an angular velocity controller 30C, and a vibration suppression controller 40C. The azimuth command generator 10A provided in the azimuth control apparatus 1C is the same as the azimuth command generator 10A provided in each of the azimuth control apparatuses 1A and 1B according to Embodiments 1 and 2. The difference between Embodiment 1 and Embodiment 2 is that as the inputs to the vibration suppression controller 40C, the actual angular velocity aav and the actual azimuth aaz among the sensor group information items sgi are utilized.

Figure 9:
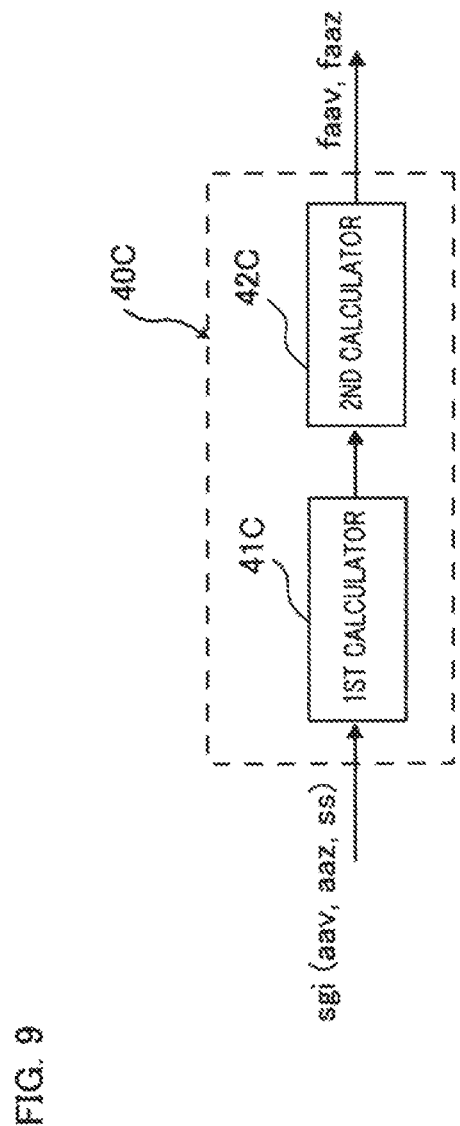
FIG. 9 is a functional block diagram representing the internal configuration of a vibration suppression controller in the vessel-azimuth control apparatus according to Embodiment 3.

Next, the vibration suppression controller 40C will be explained in detail. FIG. 9 is a functional block diagram representing the internal configuration of the vibration suppression controller in the vessel-azimuth control apparatus according to Embodiment 3. In FIG. 9, the vibration suppression controller 40C receives the actual angular velocity aav and the actual azimuth aaz among the sensor group information items sgi, which are the outputs of the sensor group 200, and then outputs a processed actual angular velocity faav and a processed actual azimuth faaz to the angular velocity controller 30C and the azimuth controller 20C, respectively.

The vibration suppression controller 40C includes a first calculator 41C and a second calculator 42C. The first calculator 41C is a filter that topically attenuates only an AC main component, outside the angular velocity control band, that is superimposed on the actual angular velocity aav; for example, the first calculator 41C is a notch filter whose center frequency corresponds to the foregoing AC main component. The second calculator 42C is a filter that attenuates an AC subcomponent, outside the angular velocity control band, that is superimposed on the actual angular velocity aav; for example, the second calculator 42C is a lowpass filter. The designing methods for the parameters of each of the respective filter of the first calculator 41C and the second calculator 42C are the same as those in Embodiment 1; the parameters of each of the respective filters of the first calculator 41C and the second calculator 42C are configured in the same manner as the parameters of each of the respective filters of the first calculator 41A and the second calculator 42A represented in Embodiment 1.

Figure 10:
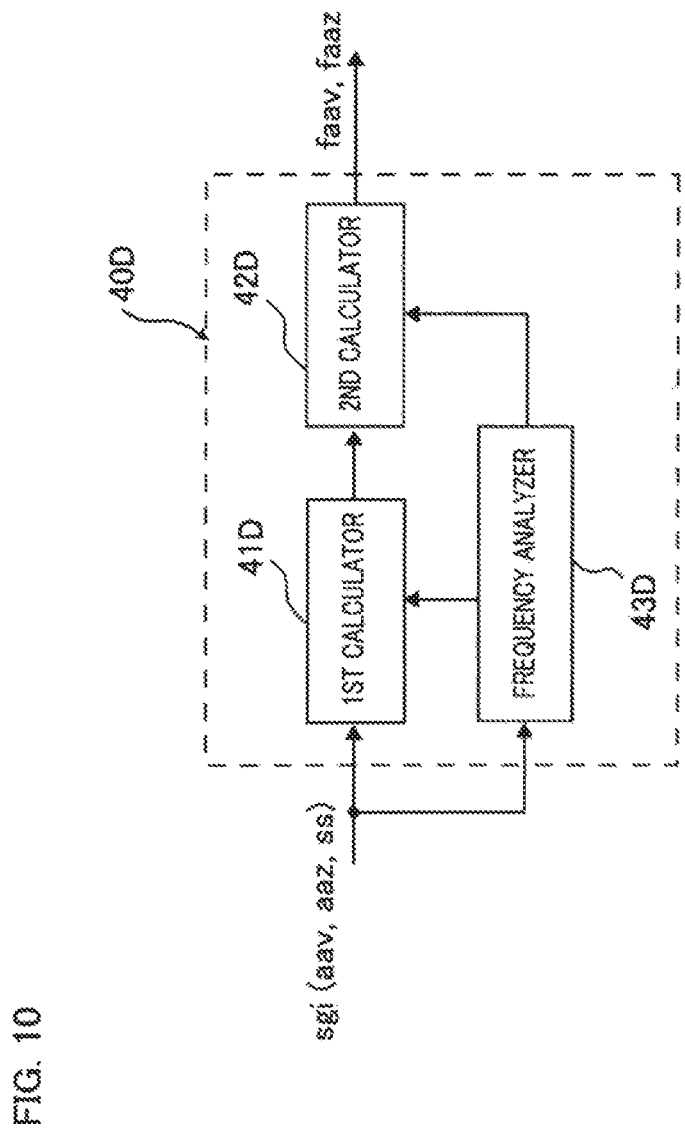
FIG. 10 is a functional block diagram representing another example of the internal configuration of the vibration suppression controller in the vessel-azimuth control apparatus according to Embodiment 3.

FIG. 10 is a functional block diagram representing another example of the internal configuration of the vibration suppression controller in the vessel-azimuth control apparatus according to Embodiment 3. In the vessel-azimuth control apparatus 1C according to Embodiment 3, a vibration suppression controller 40D represented in FIG. 10 can be utilized instead of the vibration suppression controller 40C represented in foregoing FIG. 9. In FIG. 10, the vibration suppression controller 40D receives the actual angular velocity aav and the actual azimuth aaz among the sensor group information items sgi, which are the outputs of the sensor group 200, and then outputs the processed actual angular velocity faav and the processed actual azimuth faaz.

The vibration suppression controller 40D receives the actual angular velocity aav and the actual azimuth aaz among the sensor group information items sgi, which are the outputs of the sensor group 200, and then outputs the processed actual angular velocity faav and the processed actual azimuth faaz to the angular velocity controller 30C and the azimuth controller 20C, respectively. The vibration suppression controller 40D includes a first calculator 41D, a second calculator 42D, and a frequency analyzer 43D. The parameters of the respective filters of the first calculator 41D and the second calculator 42D can adaptively be determined in the same manner as Embodiment 2. From the frequency and the amplitude of the AC main component that is obtained by main-component analysis and is outside the angular velocity control band, the frequency analyzer 43D outputs the center frequency, the notch damping ratio, and the notch depth to the first calculator 41D. Furthermore, from the frequency and the amplitude of the AC subcomponent that is obtained by similar analysis and is outside the angular velocity control band, the frequency analyzer 43D outputs the cut-off frequency to the second calculator 42D.

Figure 11A:
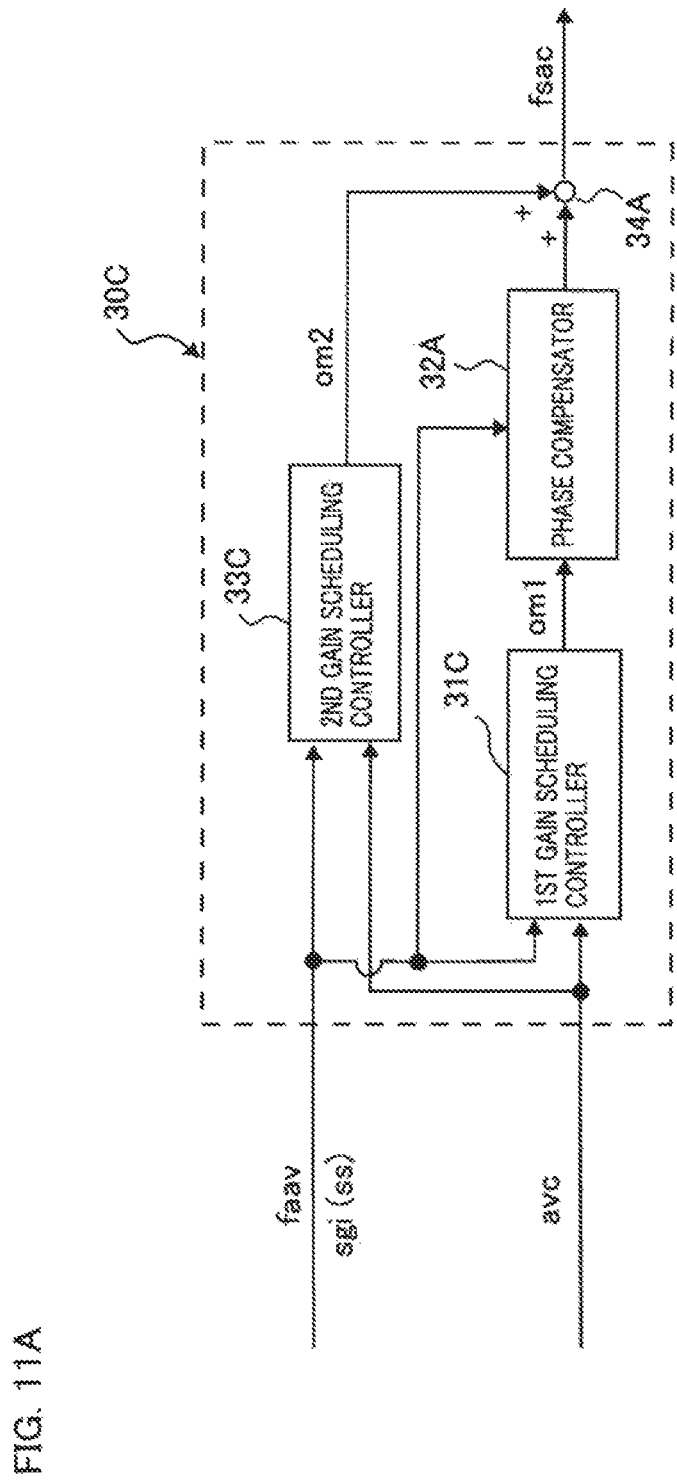
FIG. 11A is a functional block diagram representing the internal configuration of an angular velocity controller in the vessel-azimuth control apparatus according to Embodiment 3.

Next, the angular velocity controller 30C will be explained. FIG. 11A is a functional block diagram representing the internal configuration of the angular velocity controller in the vessel-azimuth control apparatus according to Embodiment 3. In FIG. 11A, based on an angular velocity deviation corresponding to the difference between the angular velocity command avc, which is the output of the azimuth controller 20C, described later, and the processed actual angular velocity faav, which is the output of the vibration suppression controller 40C or the vibration suppression controller 40D, and the vessel speed ss among the sensor group information items sgi, the first gain scheduling controller 31C performs feed-forward control so as to make the foregoing angular velocity deviation become zero; then, the first gain scheduling controller 31C outputs the first operation amount om1, as the output thereof. The first gain scheduling controller 31C can be configured in the same manner as Embodiment 1. Moreover, as preprocessing of the deviation signal representing the foregoing angular velocity deviation, there may be adopted, for example, dead-zone processing in which in a preliminarily set zone having a small angular velocity deviation, the angular velocity deviation is conveniently made zero. The phase compensator 32A is the same as that in each of Embodiments 1 and 2.

Figure 11B:
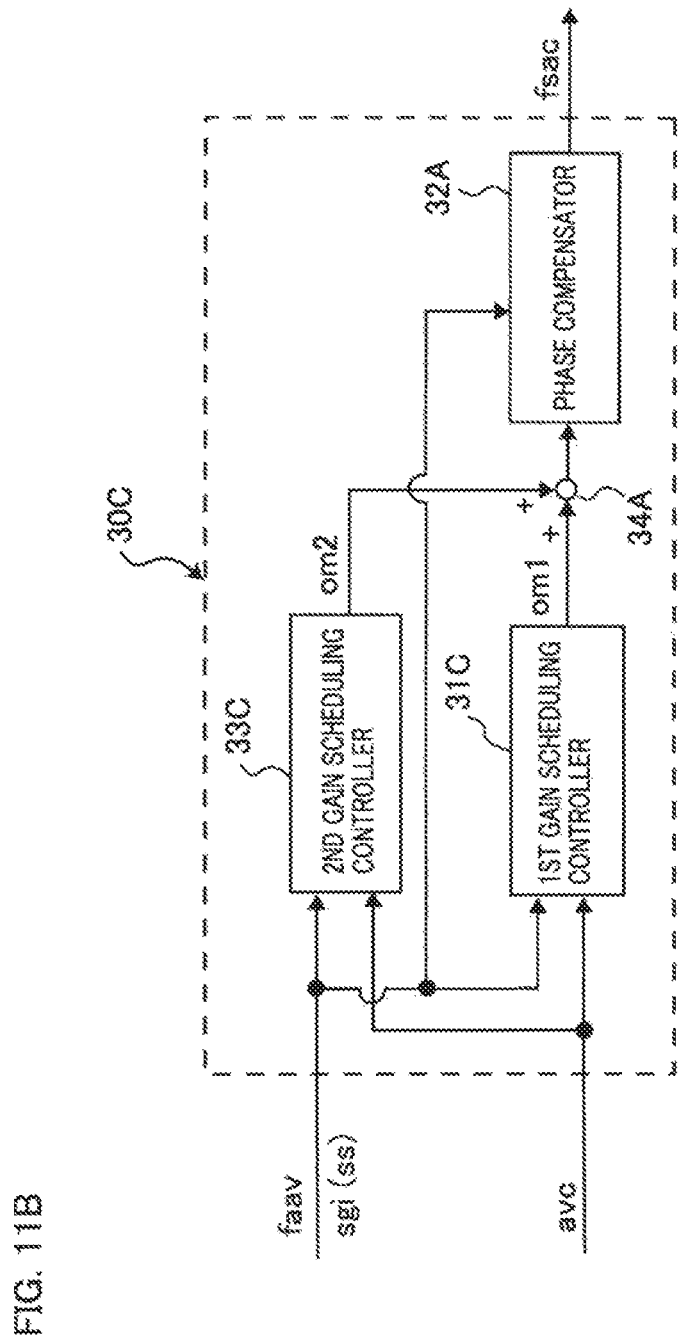
FIG. 11B is a functional block diagram representing another example of the internal configuration of the angular velocity controller in the vessel-azimuth control apparatus according to Embodiment 3.

FIG. 11B is a functional block diagram representing another example of the internal configuration of the angular velocity controller in the vessel-azimuth control apparatus according to Embodiment 3. In the vessel-azimuth control apparatus 1C according to Embodiment 3, the angular velocity controller 30C represented in FIG. 11B can be utilized instead of the angular velocity controller 30C represented in foregoing FIG. 11A. The difference from foregoing FIG. 11A is that the phase compensator 32A is disposed in a stage following the addition point 34A where the first operation amount om1, which is the output of the first gain scheduling controller 31C, and the second operation amount om2, which is the output of the second gain scheduling controller 33C, are added. In this case, as the first gain scheduling controller 31C, the one described in Embodiment 1 can be utilized as it is.

As the internal gain of the second gain scheduling controller 33C, there is given the gain of an inverse model of a frequency transfer function approximating the frequency response characteristic for the coverage from the actual steering angle asa to the actual angular velocity aav. Alternatively, it may be allowed that there is given the gain of an inverse model of the frequency transfer function for the coverage from an addition point 34A, at which the second operation amount om2 is added to the first operation amount om1, to the sensor group 200. The gain of each of these inverse models is a variable gain that varies in accordance with the vessel speed ss.

The azimuth controller 20C represented in FIG. 8 is to perform feedback-control in such a way that an azimuth deviation corresponding to the difference between the azimuth command azc, which is the output of the azimuth command generator 10A, and the processed actual azimuth faaz, which is the output of the vibration suppression controller 40C or the vibration suppression controller 40D, becomes zero. The azimuth controller 20C may have one of various kinds of structures such as those of a PID controller and the like. As described above, the angular velocity control band of the steering angle control system 100 is constant regardless of the vessel speed ss; thus, the gain of the azimuth controller 20C can uniquely be obtained regardless of the vessel speed ss, in such a way that the closed-loop transfer function for the coverage from the azimuth command azc to the actual azimuth aaz becomes to have a desired characteristic, based on the azimuth control band and the normative closed-loop transfer function for the coverage from the azimuth command azc to the actual azimuth aaz that are determined by the designer. Moreover, as preprocessing of the deviation signal representing the foregoing azimuth deviation, there may be adopted, for example, dead-zone processing in which in a preliminarily set zone having a small deviation, the azimuth deviation is conveniently made zero.

Embodiment 3 described above includes at least the configurations below.

(10) A vessel-azimuth control apparatus that has a steering angle control system for controlling a steering angle of a vessel, based on a command for controlling a steering angle, that is provided in a vessel control apparatus that steers the vessel, based on control of the steering, and that has a function of making the vessel sail while holding a desired azimuth or making the vessel sail while changing an azimuth to a desired one, the vessel-azimuth control apparatus comprising:

a vibration suppression controller that suppresses and outputs a vibration component existing outside a control band and superimposed on sensor group information from a sensor group provided in the vessel;

an azimuth command generator that converts an azimuth signal generated through operation of a user interface into an azimuth command and then outputs the azimuth command;

an azimuth controller that generates and outputs an angular velocity command, based on the azimuth command and a processed actual azimuth outputted from the vibration suppression controller; and an angular velocity controller that generates and outputs a final steering angle command, based on the angular velocity command and a processed actual angular velocity outputted from the vibration suppression controller, wherein the final steering angle command is provided, as a command for controlling the steering angle, to the steering angle control system.

This configuration makes it possible to suppress a vibration, which is a hindrance at a time when an azimuth is held or azimuths are changed, and to perform angular velocity control that is stable in all of the vessel speed region.

(11) The angular velocity controller includes a first gain scheduling controller that generates and outputs a first operation amount, based on a deviation between the angular velocity command and the processed actual angular velocity and a gain that varies in accordance with a vessel speed among the sensor group information items, a phase compensator that advances a phase of the first operation amount by a predetermined amount at a predetermined vessel speed, based on the first operation amount and a vessel speed among the sensor group information items, and a second gain scheduling controller that generates and outputs a second operation amount, based on the angular velocity command and a variable gain that varies in accordance with a vessel speed among the sensor group information items; an output of the phase compensator and the second operation amount are added so that the final steering angle command is generated.

This configuration makes it possible to suppress a vibration, which is a hindrance at a time when an azimuth is held or azimuths are changed, and to perform angular velocity control that is stable in all of the vessel speed region.

Moreover, Embodiment 3 includes at least the method below.

(12) A vessel-azimuth controlling method for making a vessel sail while holding a desired azimuth or while changing an azimuth to a desired one, the vessel-azimuth controlling method comprising the steps of:

suppressing a vibration component existing outside a control band and superimposed on sensor group information from a sensor group provided in the vessel so as to generate a processed actual azimuth and a processed actual angular velocity;

converting an azimuth signal obtained through operation of an user interface into an azimuth command;

generating an angular velocity command for making a deviation between the azimuth command and the processed actual azimuth zero;

generating a final steering angle command for making a deviation between the angular velocity command and the processed actual angular velocity zero; and controlling an azimuth of the vessel, based on the final steering angle command.

This method makes it possible to suppress a vibration, which is a hindrance at a time when an azimuth is held or azimuths are changed, and to perform angular velocity control that is stable in all of the vessel speed region.

As described above, Embodiment 3 makes it possible to obtain the same effect as that of each of Embodiments 1 and 2.

Furthermore, in all of foregoing Embodiments, there can be constructed an angular velocity control system that is always constant regardless of the vessel speed; therefore, it is made possible to add a function of freely adjusting, through operation of the user interface 600, the azimuth control band, i.e., the azimuth control response of the azimuth control system included in the external control loop of the angular velocity control system, in accordance with the intention of not only the designer but also a vessel operator himself. For example, the azimuth control band can be adjusted at a proportion smaller than 1, such as ⅓, ¼, or the like, with respect to the angular velocity control band. Furthermore, in the case where the angular velocity control band and the azimuth control band can be set at a specific proportion, the both control bands can concurrently be expanded or narrowed by multiplying the gain of the angular velocity controller by a coefficient.

In each of foregoing Embodiments, the control portion including the azimuth command generator 10A, the azimuth controller 20A, the angular velocity controller 30A, the vibration suppression controller 40A in the azimuth control apparatus 1A represented in FIG. 2, and the functions represented in FIGS. 3 to 11, included in the respective corresponding ones thereof, may be configured with separate control circuits or may collectively be configured with a single control circuit. The foregoing control portion may include the steering angle control system 100 for controlling the respective steering angles of the outboard motor and the inboard motor. Regarding this point, each of the processing circuits for realizing these functions can be configured with either dedicated hardware or a CPU (Central Processing Unit: referred to also as a processing device, a calculation device, a microprocessor, a microcomputer, a processor, or a DSP).

Figure 12A:
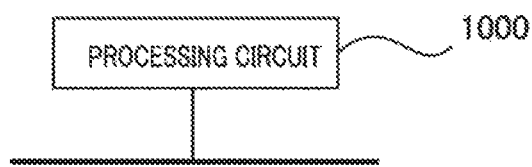
FIG. 12A is a block diagram representing an example at a time when the control portion in each of the vessel-azimuth control apparatuses according to Embodiments 1 through 3 is configured with hardware.

FIG. 12A is a block diagram representing an example at a time when the control portion in each of the vessel-azimuth control apparatuses according to Embodiments 1 through 3 is configured with hardware. In FIG. 12A, for example, a single circuit, a composite circuit, a programmed processor, a parallel-programmed processor, an ASIC, an FPGA, or a combination thereof corresponds to a processing circuit 1000. Each of the functions of the foregoing units may be realized by a processing circuit; alternatively, the respective functions of the units may collectively be realized by a processing circuit.

Figure 12B:
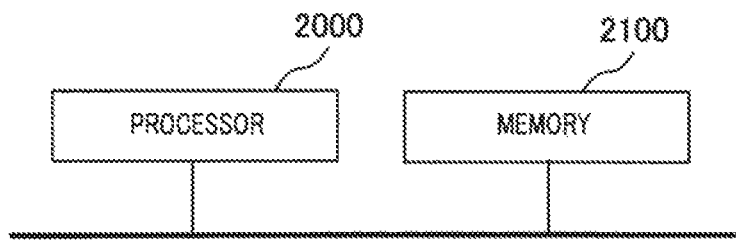
FIG. 12B is a block diagram representing an example of a hardware configuration at a time when the control portion in each of the vessel-azimuth control apparatuses according to Embodiments 1 through 3 is configured with software.

FIG. 12B is a block diagram representing an example of a hardware configuration at a time when the control portion in each of the vessel-azimuth control apparatuses according to Embodiments 1 through 3 is configured with software; each of the functions of the control portions according to the respective embodiments is realized by software, firmware, or a combination of software and firmware. In FIG. 12B, each of the software and the firmware is described as a program and is stored in a memory 2100. A processor 2000, which is a processing circuit, reads and implements the programs stored in the memory 2100 so as to realize the functions of the respective units. It can also be said that these programs make a computer implement the respective procedures and methods in the foregoing units. In the present embodiment, for example, a nonvolatile or volatile semiconductor memory such as a RAM, a ROM, a flash memory, an EPROM, or an EEPROM, a magnetic disk, a flexible disk, an optical disk, a compact disk, a minidisk, a DVD, or the like corresponds to the memory 2100.

Regarding the respective functions of the foregoing units, it may be allowed that part of them are realized by hardware and part of them are realized by software or firmware.

As described above, in the processing circuits of the respective embodiments, each of the foregoing functions can be realized by hardware, software, firmware, or a combination thereof. Each of the various kinds of information items required for processing is preliminarily set in the circuit when the processing circuit is configured with hardware or is preliminarily stored in the memory when the processing circuit is configured with software.

The respective embodiments can be combined with one another and can appropriately be modified or omitted.

What is claimed is:

1. A vessel-azimuth control apparatus that has a steering angle control system for controlling a steering angle of a vessel, the vessel-azimuth control apparatus comprising at least one processor, the at least one processor comprises:

an azimuth command generator that converts an azimuth signal, which is generated based on a vessel steering instruction received through a user interface, into an azimuth command and then outputs the azimuth command;

an azimuth controller that generates and outputs an angular velocity command, based on the azimuth command;

an angular velocity controller that generates a first output signal based on a deviation between the angular velocity command and a measured angular velocity, shifts a phase of the first output signal by a predetermined amount based on a vessel speed, generates a second output signal based on the angular velocity command and a variable gain that varies as the vessel speed changes, and generates a steering angle command by adding the first output signal having the shifted phase and the second output signal to the angular velocity command; and a vibration suppression controller that suppresses a vibration noise added to the steering angle command and existing outside an angular velocity control range and that generates and outputs a final steering angle command, wherein the final steering angle command is provided to the steering angle control system to control the steering angle.

2. The vessel-azimuth control apparatus according to claim 1,
wherein the vibration suppression controller includes
a first calculator that attenuates a first alternating coupling (AC) component, outside the angular velocity control range, that is added to the steering angle command outputted from the angular velocity controller, and
a second calculator that attenuates a second AC component, outside the angular velocity control range, that is added to an output of the first calculator,
a frequency analyzer that extracts vibration noises added to a measured angular velocity among sensing data outputted from a sensor group provided in the vessel and then outputs a frequency and an amplitude of the first AC component and a frequency and an amplitude of the second AC component outside the angular velocity control range,
wherein a control parameter of the first calculator is given based on a frequency and an amplitude of the first AC component, outside the angular velocity control range, that is outputted from the frequency analyzer, and
wherein a control parameter of the second calculator is given based on a frequency and an amplitude of the second AC component, outside the angular velocity control range, that is outputted from the frequency analyzer.

3. The vessel-azimuth control apparatus according to claim 1,
wherein the vibration suppression controller includes
a calculator that attenuates an alternating coupling (AC) component, outside the angular velocity control range, that is added to a steering angle command outputted from the angular velocity controller, and
a frequency analyzer that extracts vibration noises added to a measured angular velocity among sensing data outputted from a sensor group provided in the vessel and then outputs a frequency and an amplitude of the AC component outside the angular velocity control range, and
wherein a control parameter of the calculator is given based on the frequency and the amplitude of the AC component, outside the angular velocity control range, that is outputted from the frequency analyzer.

4. The vessel-azimuth control apparatus according to claim 1,
wherein the angular velocity controller includes
a first gain scheduling controller that generates and outputs the first output signal, based on the deviation between the angular velocity command and the measured angular velocity and a gain that varies as the vessel speed changes;
a phase compensator that shifts the phase of the first output signal by the predetermined amount and outputs the first output signal having the shifted phase, based on the first output signal and the vessel speed; and
a second gain scheduling controller that generates and outputs the second output signal, based on the angular velocity command and the variable gain that varies as the vessel speed changes,
wherein an output of the phase compensator and the second output signal are added so that the steering angle command is generated.

5. The vessel-azimuth control apparatus according to claim 4,
wherein the vibration suppression controller includes
a calculator that attenuates an alternating coupling (AC) component, outside the angular velocity control range, that is added to a steering angle command outputted from the angular velocity controller, and
a frequency analyzer that extracts vibration noises added to a measured angular velocity among sensing data outputted from a sensor group provided in the vessel and then outputs a frequency and an amplitude of the AC component outside the angular velocity control range, and
wherein a control parameter of the calculator is given based on the frequency and the amplitude of an AC component, outside the angular velocity control range, that is outputted from the frequency analyzer.

6. The vessel-azimuth control apparatus according to claim 4,
wherein the vibration suppression controller includes only one of
a first calculator that attenuates a first alternating coupling (AC) component, outside the angular velocity control range, that is added to the steering angle command, and
a second calculator that attenuates a second AC component, outside the angular velocity control range, that is added to the steering angle command, and
wherein a control parameter of any one of the first calculator and the second calculator included in the vibration suppression controller is given as a fixed value in all of a vessel speed region, a function of the vessel speed among the sensing data, or a map, based on
a preliminarily obtained frequency response characteristic of a measured steering angle to the steering angle command, for each of two or more different vessel speeds, when the vessel is made to perform constant-speed sailing at each of the different vessel speeds, and
a preliminarily obtained frequency response characteristic of a measured angular velocity to the measured steering angle, for each of two or more different vessel speeds, when the vessel is made to perform constant-speed sailing at each of the different vessel speeds.

7. The vessel-azimuth control apparatus according to claim 4,
wherein the vibration suppression controller includes
a first calculator that attenuates a first alternating coupling (AC) component, outside the angular velocity control range, that is added to the steering angle command outputted from the angular velocity controller, and a second calculator that attenuates a second AC component, outside the angular velocity control range, that is added to an output of the first calculator, a frequency analyzer that extracts vibration noises added to a measured angular velocity among sensing data outputted from a sensor group provided in the vessel and then outputs a frequency and an amplitude of the first AC component and a frequency and an amplitude of the second AC component outside the angular velocity control range, wherein a control parameter of the first calculator is given based on a frequency and an amplitude of the first AC component, outside the angular velocity control range, that is outputted from the frequency analyzer, and wherein a control parameter of the second calculator is given based on a frequency and an amplitude of the second AC component, outside the angular velocity control range, that is outputted from the frequency analyzer.

8. The vessel-azimuth control apparatus according to claim 4, wherein the vibration suppression controller includes a first calculator that attenuates a first alternating coupling (AC) component, outside the angular velocity control range, that is added to the steering angle command outputted from the angular velocity controller, and a second calculator that attenuates a second AC component, outside the angular velocity control range, that is added to an output of the first calculator, wherein each of respective control parameters of the first calculator and the second calculator is given as a fixed value in all of a vessel speed region, a function of the vessel speed among the sensing data, or a map, based on a preliminarily obtained frequency response characteristic of a measured steering angle to the steering angle command, for each of two or more different vessel speeds, when the vessel is made to perform constant-speed sailing at each of the different vessel speeds, and a preliminarily obtained frequency response characteristic of a measured angular velocity to the measured steering angle, for each of two or more different vessel speeds, when the vessel is made to perform constant-speed sailing at each of the different vessel speeds.

9. The vessel-azimuth control apparatus according to claim 4, wherein each of respective gains of the first gain scheduling controller and the second gain scheduling controller are determined, based on a preliminarily obtained frequency response characteristic of a measured steering angle to the steering angle command, for each of two or more different vessel speeds, when the vessel is made to perform constant-speed sailing at each of the different vessel speeds, a preliminarily obtained frequency response characteristic of a measured angular velocity to the measured steering angle, for each of two or more different vessel speeds, when the vessel is made to perform constant-speed sailing at each of the different vessel speeds, a design value for the angular velocity control range, and a normative closed-loop transfer function, of an angular velocity control system, that identifies the angular velocity command corresponding to the measured angular velocity, and wherein the gain is a variable gain that is given as a function of the vessel speed or a map for a predetermined vessel speed.

10. The vessel-azimuth control apparatus according to claim 9, wherein in a predetermined speed region, the phase compensator shifts a phase of the steering angle command outputted from the angular velocity controller, based on a preliminarily obtained frequency response characteristic of a measured steering angle to the steering angle command, for each of two or more different vessel speeds, when the vessel is made to perform constant-speed sailing at each of the different vessel speeds, and a preliminarily obtained frequency response characteristic of a measured angular velocity to the measured steering angle, for each of two or more different vessel speeds, when the vessel is made to perform constant-speed sailing at each of the different vessel speeds, and wherein a control parameter of the phase compensator is given as a fixed value in all of a vessel speed region, a function of the vessel speed among the sensing data, or a map.

11. The vessel-azimuth control apparatus according to claim 9, wherein the vibration suppression controller includes a first calculator that attenuates a first alternating coupling (AC) component, outside the angular velocity control range, that is added to the steering angle command outputted from the angular velocity controller, and a second calculator that attenuates a second AC component, outside the angular velocity control range, that is added to an output of the first calculator, wherein each of respective control parameters of the first calculator and the second calculator is given as a fixed value in all of a vessel speed region, a function of the vessel speed among the sensing data, or a map, based on a preliminarily obtained frequency response characteristic of a measured steering angle to the steering angle command, for each of two or more different vessel speeds, when the vessel is made to perform constant-speed sailing at each of the different vessel speeds, and a preliminarily obtained frequency response characteristic of a measured angular velocity to the measured steering angle, for each of two or more different vessel speeds, when the vessel is made to perform constant-speed sailing at each of the different vessel speeds.

12. The vessel-azimuth control apparatus according to claim 9, wherein the vibration suppression controller includes a first calculator that attenuates a first alternating coupling (AC) component, outside the angular velocity control range, that is added to the steering angle command outputted from the angular velocity controller, and a second calculator that attenuates a second AC component, outside the angular velocity control range, that is added to an output of the first calculator, a frequency analyzer that extracts vibration noises added to a measured angular velocity among sensing data outputted from a sensor group provided in the vessel and then outputs a frequency and an amplitude of the first AC component and a frequency and an amplitude of the second AC component outside the angular velocity control range, wherein a control parameter of the first calculator is given based on a frequency and the amplitude of the first AC component, outside the angular velocity control range, that is outputted from the frequency analyzer, and wherein a control parameter of the second calculator is given based on a frequency and the amplitude of the second AC component, outside the angular velocity control range, that is outputted from the frequency analyzer.

13. The vessel-azimuth control apparatus according to claim 9, wherein the vibration suppression controller includes only one of a first calculator that attenuates a first alternating coupling (AC) component, outside the angular velocity control range, that is added to the steering angle command, and a second calculator that attenuates a second AC component, outside the angular velocity control range, that is added to the steering angle command, and wherein a control parameter of any one of the first calculator and the second calculators included in the vibration suppression controller is given as a fixed value in all of a vessel speed region, a function of the vessel speed among the sensing data, or a map, based on a preliminarily obtained frequency response characteristic of a measured steering angle to the steering angle command, for each of two or more different vessel speeds, when the vessel is made to perform constant-speed sailing at each of the different vessel speeds, and a preliminarily obtained frequency response characteristic of a measured angular velocity to the measured steering angle, for each of two or more different vessel speeds, when the vessel is made to perform constant-speed sailing at each of the different vessel speeds.

14. The vessel-azimuth control apparatus according to claim 4, wherein in a predetermined speed region in which the vessel moves at a predetermined speed, the phase compensator shifts a phase of the steering angle command outputted from the angular velocity controller, based on a preliminarily obtained frequency response characteristic of a measured steering angle to the steering angle command, for each of two or more different vessel speeds, when the vessel is made to perform constant-speed sailing at each of the different vessel speeds, and a preliminarily obtained frequency response characteristic of a measured angular velocity to the measured steering angle, for each of two or more different vessel speeds, when the vessel is made to perform constant-speed sailing at each of the different vessel speeds, and wherein a control parameter of the phase compensator is given as a fixed value in all of a vessel speed region, a function of the vessel speed among the sensing data, or a map.

15. The vessel-azimuth control apparatus according to claim 14, wherein the vibration suppression controller includes a first calculator that attenuates a first alternating coupling (AC) component, outside the angular velocity control range, that is added to the steering angle command outputted from the angular velocity controller, and a second calculator that attenuates a second AC component, outside the angular velocity control range, that is added to an output of the first calculator, wherein each of respective control parameters of the first calculator and the second calculator is given as a fixed value in all of a vessel speed region, a function of the vessel speed among the sensing data, or a map, based on a preliminarily obtained frequency response characteristic of a measured steering angle to the steering angle command, for each of two or more different vessel speeds, when the vessel is made to perform constant-speed sailing at each of the different vessel speeds, and a preliminarily obtained frequency response characteristic of a measured angular velocity to the measured steering angle, for each of two or more different vessel speeds when the vessel is made to perform constant-speed sailing at each of the different vessel speeds.

16. The vessel-azimuth control apparatus according to claim 14, wherein the vibration suppression controller includes only one of a first calculator that attenuates a first alternating coupling (AC) component, outside the angular velocity control range, that is added to the steering angle command, and a second calculator that attenuates a second AC component, outside the angular velocity control range, that is added to the steering angle command, and wherein a control parameter of any one of the first calculator and the second calculators included in the vibration suppression controller is given as a fixed value in all of a vessel speed region, a function of the vessel speed among the sensing data, or a map, based on a preliminarily obtained frequency response characteristic of a measured steering angle to the steering angle command, for each of two or more different vessel speeds, when the vessel is made to perform constant-speed sailing at each of the different vessel speeds, and a preliminarily obtained frequency response characteristic of a measured angular velocity to the measured steering angle, for each of two or more different vessel speeds, when the vessel is made to perform constant-speed sailing at each of the different vessel speeds.

17. A vessel-azimuth control apparatus that has a steering angle control system for controlling a steering angle of a vessel, the vessel-azimuth control apparatus comprising at least one processor, the at least one processor comprises:

a vibration suppression controller that suppresses and outputs a vibration noise existing outside a control range and added to sensor group information from a sensor group provided in the vessel, and an azimuth command generator that converts an azimuth signal generated through operation of a user interface into an azimuth command and then outputs the azimuth command;

an azimuth controller that generates and outputs an angular velocity command, based on the azimuth command and a measured azimuth outputted from the vibration suppression controller; and an angular velocity controller that generates a first output signal based on a deviation between the angular velocity command and a measured angular velocity, shifts a phase of the first output signal by a predetermined amount based on a vessel speed, generates a second output signal based on the angular velocity command and a variable gain that varies as the vessel speed changes, and outputs a final steering angle command by adding the first output signal having the shifted phase and the second output signal to the angular velocity command, wherein the measured angular velocity is outputted from the vibration suppression controller, wherein the final steering angle command is provided to the steering angle control system to control the steering angle.

18. The vessel-azimuth control apparatus according to claim 17, wherein the angular velocity controller includes a first gain scheduling controller that generates and outputs the first output signal, based on the deviation between the angular velocity command and the measured angular velocity and a gain that varies as the vessel speed changes, a phase compensator that shifts the phase of the first output signal by the predetermined amount at a predetermined vessel speed, based on the first output signal and the vessel speed, and a second gain scheduling controller that generates and outputs the second output signal, based on the angular velocity command and the variable gain that varies as the vessel speed changes, and wherein an output of the phase compensator and the second output signal are added so that the final steering angle command is generated.

19. A vessel-azimuth controlling method, the vessel-azimuth controlling method comprising the steps of:

converting an azimuth signal generated through operation of a user interface into an azimuth command;

generating an angular velocity command for making a deviation between the azimuth command and a measured azimuth zero;

generating a steering angle command by generating a first output signal based on a deviation between the angular velocity command and a measured angular velocity zero, shifting a phase of the first output signal by a predetermined amount based on a vessel speed, generating a second output signal based on the angular velocity command and a variable gain that varies as the vessel speed changes, and generating the steering angle command by adding the first output signal having the shifted phase and the second output signal to the angular velocity command;

generating a final steering angle command by attenuating a vibration noise added to the steering angle command; and controlling an azimuth of the vessel, based on the final steering angle command.

20. A vessel-azimuth controlling method for making a vessel sail, the vessel-azimuth controlling method comprising the steps of:

suppressing a vibration noise existing outside an angular velocity control range and added to sensor group information from a sensor group provided in the vessel so as to generate a measured azimuth and a measured angular velocity;

converting an azimuth signal generated through operation of an user interface into an azimuth command;

generating an angular velocity command by generating a first output signal based on a deviation between the angular velocity command and a measured angular velocity zero, shifting a phase of the first output signal by a predetermined amount based on a vessel speed, generating a second output signal based on the angular velocity command and a variable gain that varies as the vessel speed changes, and generating the steering angle command by adding the first output signal having the shifted phase and the second output signal to the angular velocity command;

generating a final steering angle command for making a deviation between the angular velocity command and the measured angular velocity zero; and controlling an azimuth of the vessel, based on the final steering angle command.

* * * * *